US012351437B2

(12) United States Patent
Thompson

(10) Patent No.: US 12,351,437 B2
(45) Date of Patent: Jul. 8, 2025

(54) MODULAR CRANE COMPONENT SYSTEM

(71) Applicant: Jeffrey D. Thompson, Irvine, CA (US)

(72) Inventor: Jeffrey D. Thompson, Irvine, CA (US)

( * ) Notice: Subject to any disclaimer, the term of this patent is extended or adjusted under 35 U.S.C. 154(b) by 565 days.

(21) Appl. No.: 17/700,949

(22) Filed: Mar. 22, 2022

(65) Prior Publication Data

US 2022/0212899 A1 Jul. 7, 2022

Related U.S. Application Data

(62) Division of application No. 16/457,288, filed on Jun. 28, 2019, now Pat. No. 11,299,375.

(Continued)

(51) Int. Cl.

*B66C 5/00* (2006.01)
*B66C 5/02* (2006.01)
*B66C 7/02* (2006.01)
*B66C 11/04* (2006.01)
*B66C 11/16* (2006.01)
*B66C 19/00* (2006.01)

(52) U.S. Cl.

CPC .................. *B66C 5/02* (2013.01); *B66C 7/02* (2013.01); *B66C 11/04* (2013.01); *B66C 11/16* (2013.01); *B66C 19/00* (2013.01)

(58) Field of Classification Search

CPC .... B66C 5/02; B66C 7/02; B66C 7/06; B66C 7/08; B66C 7/10; B66C 7/14; B66C 11/14; B66C 11/16; B66C 17/06; B66C 19/00

See application file for complete search history.

(56) References Cited

U.S. PATENT DOCUMENTS 6,135,300 A * 10/2000 Fox ....................... B66C 23/208 182/60
7,503,460 B1 3/2009 Petricio Yaksic (Continued)

FOREIGN PATENT DOCUMENTS

CN 202201657 U 4/2012
CN 116354232 A * 6/2023

(Continued)

OTHER PUBLICATIONS

Conductix Wampfler, Enclosed Conductor Rail BoxLine Program 0842, catalog, 2015, 28 pages.

(Continued)

*Primary Examiner* — Emmanuel M Marcelo
(74) *Attorney, Agent, or Firm* — STETINA GARRED BRUCKER & NEWBOLES

(57) ABSTRACT

There is provided a method of installing spiral hangers about a messenger line installed between first and second utility poles with a cable being lashed to the messenger line with a lashing wire. The method includes attaching a first and second spiral hangers to the messenger line between first and second utility poles with the first spiral hanger disposed about the messenger line and the cable. The method includes removing the lashing wire from being around the messenger line and the cable adjacent the second spiral hanger. The method includes moving the second spiral hanger towards the second utility pole. The method includes attaching a successive spiral hanger to the messenger line between the spiral hangers and repeating the moving of the second spiral hanger and attaching another successive spiral hanger.

20 Claims, 25 Drawing Sheets

Related U.S. Application Data

(60) Provisional application No. 62/781,360, filed on Dec. 18, 2018.

(56) References Cited

U.S. PATENT DOCUMENTS

| | | | | |
|---|---|---|---|---|
| 2002/0168258 | A1* | 11/2002 | Philipps | B60P 1/5471 212/180 |
| 2011/0036799 | A1 | 2/2011 | McKay | |
| 2013/0343849 | A1 | 12/2013 | Gobert | |
| 2015/0060632 | A1 | 3/2015 | Ralls | |
| 2016/0251201 | A1 | 9/2016 | Cox | |
| 2018/0044146 | A1 | 2/2018 | Donahue | |
| 2020/0010306 | A1 | 1/2020 | McKay | |

FOREIGN PATENT DOCUMENTS

| | | | | | |
|---|---|---|---|---|---|
| DE | 202009009241 | U1 | * | 10/2009 | B66C 23/02 |
| GB | 2392562 | A | * | 3/2004 | H01Q 1/084 |
| JP | S61107804 | U | | 7/1986 | |

OTHER PUBLICATIONS

O'Grien Installations Limited, Met-Track Workstation Cranes Workstation Jib Cranes, brochure, [retrieved 2019], 8 pages.
O'Brien Installations Limited, Met-Track Workstation Cranes Workstation Bridge Cranes, brochure, [retrieved 2019], 16 pages.
Metreel, Inc. Safetrack Fall Arrest & Fall Restraint Rigid Rail Anchor Systems, brochure, [retrieved 2019], 16 pages.
Spanco Inc., Installation and Maintenance Manual for SPANCO Ceiling Mounted Workstation Bridge Cranes, rev. Aug. 2014, 32 pages.
Spanco Inc., Product Line Card Overhead Cranes, [retrieved 2019], 2 pages.
Spanco Inc., Industrial Gantry Cranes, catalog, 2015, 40 pages.
Spanco Inc., Enclosed Track Workstation Bridge Cranes, catalog, 2017, 28 pages.
Spanco Inc., Industrial Jib Cranes, catalog, 2015, 28 pages.
Rigid Lifelines, Installation and Maintenance Manual for Rigid Lifelines Traveling Bridge Fall Protection Systems, rev. Jun. 2014, 44 pages.
Rigid Lifelines, Fall Protection Solutions, brochure, [retrieved 2019], 32 pages.

* cited by examiner

MODULAR CRANE COMPONENT SYSTEM

CROSS-REFERENCE TO RELATED APPLICATIONS

The present application is a divisional of U.S. patent application Ser. No. 16/457,288, filed on Jun. 28, 2019, which is a non-provisional patent application of and claims priority to U.S. Provisional Patent Application Ser. No. 62/781,360, filed on Dec. 18, 2018, entitled MODULAR CRANE COMPONENT SYSTEM, the entire contents of which are incorporated herein by reference.

STATEMENT RE: FEDERALLY SPONSORED RESEARCH/DEVELOPMENT

Not Applicable

BACKGROUND

1. Technical Field

The present disclosure relates generally to cranes. More particularly, the present disclosure relates to a modular crane component system.

2. Related Art

Light capacity cranes commonly referred to as workstation cranes are used in a variety of industrial applications for lifting and moving material that would otherwise be too heavy to lift manually. These systems typically have a rated lifting capacity between 250 lbs. to 4,000 lbs. These systems typically include an overhead track that allows for a trolley to traverse along the overhead track. A cable or the like that is used to support a load may extend from the trolley. The trolley may typically be manually pulled or pushed, manually winched or electrically motorized. Depending upon the specific configuration, these cranes may include such types as workstation bridge cranes, portable gantry cranes, work station jib cranes, workstation monorails, and so forth. Rigid horizontal fall protection systems are used to keep people safe at height and offer the operator freedom of movement to perform tasks while at height.

Rigid fall protection systems typically share many of the same structural design as used in light capacity cranes. Fall protection systems come in a variety of configurations that correspond to light capacity cranes but are rated for fall protection rather than lifting. These may include travelling bridge systems, fall protection A-frames, fall protection swing arms, fall protection monorails, and others.

Regardless of the type of crane or fall protection system, these traditional systems have several shortcomings resulting from their design. Historically, specific dimensional requirements for length, width and height dictate that custom fabrication take place once an order is received. This results in a lengthy and costly fabrication cycle.

In view of the foregoing, there is a need in the art for improved crane system designs in comparison to the prior art.

BRIEF SUMMARY

In accordance with one embodiment, there is provided an overhead modular crane system. The crane system includes a main track having opposing track ends. The main track includes at least two elongate track sections. Each of the track sections is endwise connectable to an abutting track section. The track sections are endwise connected to each other and defining a track joint thereat. The main track further includes a stiffener passage extending between the track ends and through each of the track sections. The main track further includes a track channel extending between the track ends and through each of the track sections. The track channel is open away from the stiffener passage. The crane system further includes a top cord stiffener having opposing stiffener ends. The top cord stiffener is disposed in and through the stiffener passage. The stiffener ends are respectively aligned with the track ends. The top cord stiffener includes at least three elongate stiffener sections. Each of the stiffener sections is endwise connectable to an abutting stiffener section. The stiffener sections are endwise connected to each other and defining a stiffener joints thereat. None of the stiffener joints being aligned with the track joint.

In accordance with various embodiments, the at least two elongate track sections are two elongate track sections, and the at least three elongate track stiffeners are three elongate track stiffeners. The crane system may further include a pair of end caps. Each end cap is sized and configured to receive a stiffener section therein and a track section therein. The end caps are attached to the main track with the main track disposed between the end caps. The end caps are attached to the top cord stiffener with the top cord stiffener disposed between the end caps. The crane system may include a trolley engaged with the main track. The trolley is sized and configured to traverse along the track channel. The crane system may further include an electric motor in electrical communication with the trolley for selectively traversing the trolley along the track channel. The crane system may further include a lift cable engaged with the trolley and extending from the trolley away from the track channel. The crane system may further include a column attached to the main track. The column may be attached to the main track by the column being attached to an end cap.

According to another aspect of the invention, there is provided a repositionable crane base support system for use with a central column and anchor bolts extending from a floor. The crane base support system includes a base plate. The crane base support system further includes a central column support extending from the base plate. The central column support is sized and configured to engage the central column. The crane base support system further includes anchor bolt apertures formed through the based plate and distributed about the central column support. Each of the apertures correspond to a respective one of the anchor bolts. The crane base support system further includes circular caps cooperatively sized and configured with the anchor bolt apertures. The circular caps are positioned within a respective one of the anchor bolt apertures and rotatable therein. Each circular cap includes a bolt hole sized and configured to receive an anchor bolt therethrough. Each bolt hole is off-set from a center of each respective circular cap.

In accordance with various embodiments, each circular cap may include a cap body extending along a cap central longitudinal axis. Each bolt hole is defined by a bolt hole central longitudinal axis disposed parallel to and offset from the associated central cap longitudinal axis. Each circular cap may include a cap body having a cap body outer surface with each bolt hole being non-concentrically disposed through the cap body with respect to the cap body outer surface. Each circular cap may include a cap body extending along a cap central longitudinal axis. Each circular cap may further include a flanged lip extending radially from the cap body, and each cap body may be disposed in a corresponding one of the anchor bolt apertures. The base plate may include a base plate top side and an opposing base plate bottom side. Each circular cap may be positionable in a corresponding one of the anchor bolt apertures with the flanged lip disposed against the base plate top side with the base plate disposed upon the floor.

The base plate may include a base plate top side and an opposing base plate bottom side. Each circular cap is positionable in a corresponding one of the anchor bolt apertures with the flanged lip disposed against the base plate bottom side with the flanged lip upon the floor. The crane base support system may further include support legs each having a distal end and an attachment end. The attachment end of each of the support legs may be attached to the base plate and with the distal ends extendable along the floor away from the base plate. The crane base support system may further include a central column attached to the central column support extending away from the base plate. The crane base support system may further include angle braces corresponding to each support leg, and each angle brace is attached to the distal end of the corresponding support leg and the central column.

According to another aspect of the invention, there is provided a crane base support system for use with a parapet wall extending vertically from a floor. The crane base support system includes a base plate positionable upon the floor. The crane base support system further includes a central column extending from the base plate. The crane base support system further includes support legs each having a distal end and an attachment end. The attachment end of each of the support legs is rotatably attached to the base plate. The support legs each have an extended position with the support legs extending radially from the base plate and a folded position with support legs extending generally along the central column. The crane base support system further includes a parapet wall clamp attached to and extending laterally from the central column. The parapet wall clamp has a jaw opening facing generally towards the base plate. The jaw opening is sized and configured to receive and engage the parapet wall.

In accordance with various embodiments, the parapet wall clamp may include a clamp arm attached to the central column and disposed between the central column and the jaw. The parapet wall clamp may be selectively laterally positionable from the central column for adjusting a distance of the jaw from the central column. The parapet wall clamp is selectively laterally positionable along the central column for adjusting a height of the jaw from the floor. The base plate may have clevis attachment elements generally extending from the base plate in a direction of the central column. Each attachment end of the support legs may be attached to the base plate via rotational engagement with a respective one of the clevis attachment elements. The central column may include a base end attached to the base plate and a crane end disposed away from the base plate. The system may further include an elongate crane track attached to the crane end of the central column and extending generally in a same direction of the parapet wall clamp. The crane base support system may further include a trolley engaged with the crane track. The trolley may be sized and configured to traverse along the elongate crane track.

According to another aspect of the invention, there is provided a crane base support system for use with a parapet wall extending vertically from a floor. The crane base support system includes a first base plate positionable adjacent the floor. The crane base support system further includes a first central column extending from the first base plate. The first central column includes a base end attached to the first base plate and a crane end disposed away from the first base plate. The crane base support system further includes a parapet wall clamp attached to and extending laterally from the first central column. The parapet wall clamp having a jaw opening facing generally towards the first base plate. The jaw opening is sized and configured to receive and engage the parapet wall. The crane base support system further includes a second base plate positionable adjacent the floor. The crane base support system further includes a second central column extending from the second base plate. The second central column includes a base end attached to the second base plate and a track end disposed away from the second base plate. The crane base support system further includes a main track disposed between the first and second central columns, and attached to the crane end of the first central column and attached to the track end of the second central column.

In accordance with various embodiments, the crane base support system may further include an elongate crane track attached to the crane end of the first central column and extending generally in a same direction of the parapet wall clamp and away from the main track. The crane base support system may further include a trolley engaged with the crane track, and the trolley may be sized and configured to traverse along the elongate crane track. The parapet wall clamp may include a clamp arm attached to the central column and disposed between the central column and the jaw. The parapet wall clamp may be selectively laterally positionable from the central column for adjusting a distance of the jaw from the central column. The parapet wall clamp may be selectively laterally positionable along the central column for adjusting a height of the jaw from the floor. The crane base support system may further include a counter-weight support and a counter-weight. The counter-weight support may be removeably attached to the second base plate, and the counter-weight may be disposed upon the counter-weight support. The crane base support system may further include first support legs each having a distal end and an attachment end. The attachment end of each of the first support legs is attached to the first base plate and with the distal ends extendable along the floor and away from the first base plate. The crane base support system further includes second support legs each having a distal end and an attachment end. The attachment end of each of the second support legs is attached to the second base plate and with the distal ends extendable along the floor and away from the second base plate. The crane base support system may further include casters attached to the distal ends of the first and second support legs.

According to another aspect of the invention, there is provided a combined trolley winch system with lift and traverse selection. The trolley winch system includes an overhead track. The trolley winch system further includes a trolley engaged with the overhead track. The trolley and the track are cooperatively sized and configured to traverse the trolley along the track. The trolley winch system further includes a first winch drum having a lift cable cylindrical surface disposed about a reel axis of rotation. The trolley winch system further includes a lift cable engaged with the winch drum about the lift cable cylindrical surface and engaged with the trolley. The trolley winch system further includes a second winch drum having a traverse cable cylindrical surface disposed about the reel axis of rotation. The trolley winch system further includes a traverse cable engaged with the winch drum about the traverse cable cylindrical surface and engaged with the trolley. The trolley winch system further includes a winding mechanism connected to the first and second drums. The winding mechanism sized and configured to rotate the first drum about the reel axis of rotation for winding the lift cable about the lift cable cylindrical surface independently from rotating the traverse cable cylindrical surface. The winding mechanism sized and configured to rotate the second drum about the reel axis of rotation for winding the traverse cable about the traverse cable cylindrical surface independently from rotating the lift cable cylindrical surface.

In accordance with various embodiments, the winding mechanism may include a spline support shaft disposed about the reel axis of rotation between the first and second drums. The first drum may have a first spline receptacle longitudinally extending into the first drum. The second drum may have a second spline receptacle longitudinally extending into the second drum. The spline support shaft may be longitudinally movable along the reel axis of rotation. The first spine receptacle may be sized and configured to receive and engage the spline support shaft therein. The second spine receptacle may be sized and configured to receive and engage the spline support shaft therein. The spine support shaft may be positionable within the first spine receptacle without being within the second spline receptacle. The spine support shaft may be positionable within the second spine receptacle without being within the first spline receptacle.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of the present disclosure and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, first and second, and the like are used solely to distinguish one entity from another without necessarily requiring or implying any actual such relationship or order between such entities.

Figure 1:
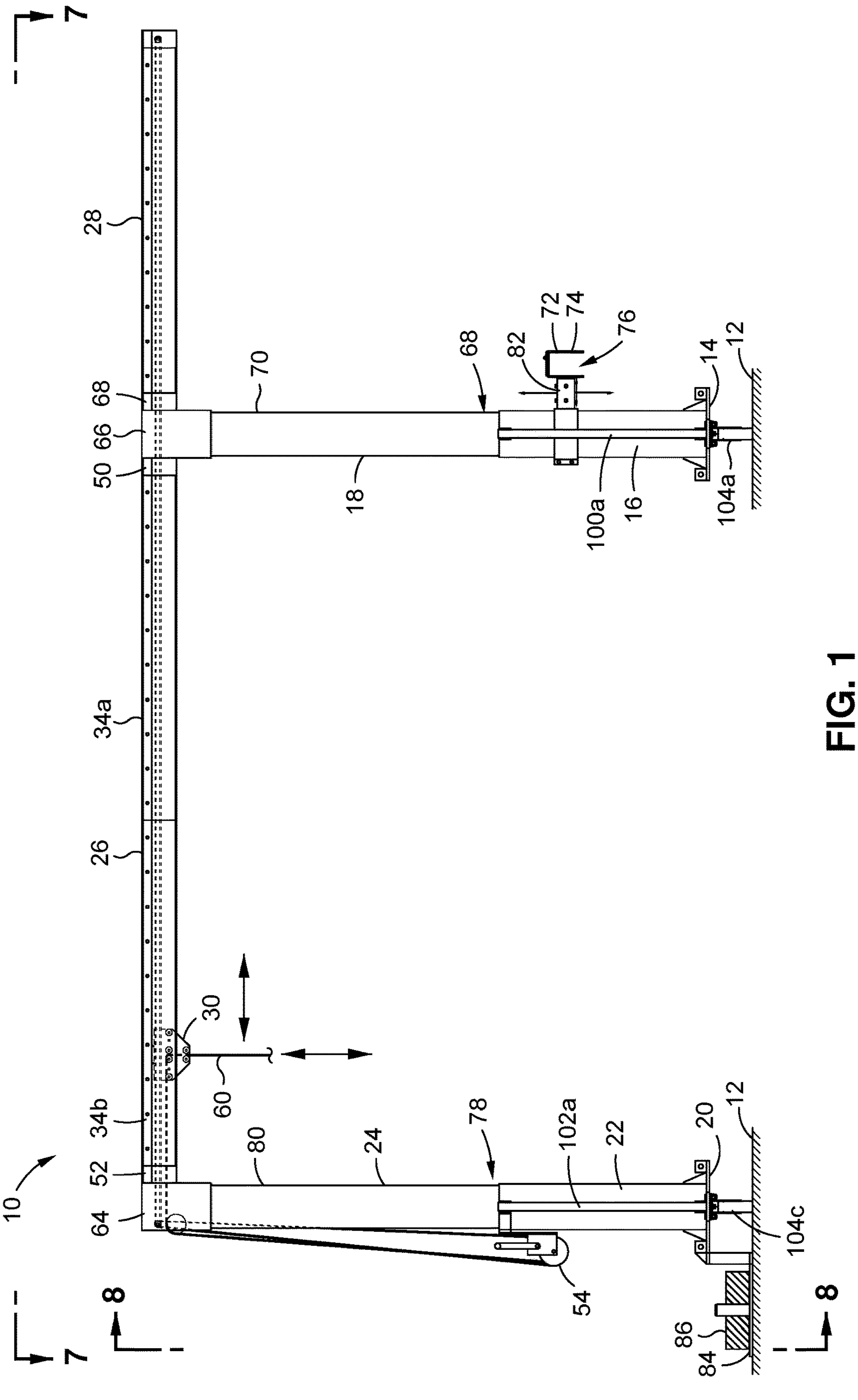
FIG. 1 is a side view of an overhead modular crane system according to an aspect of the present invention.
Figure 7:
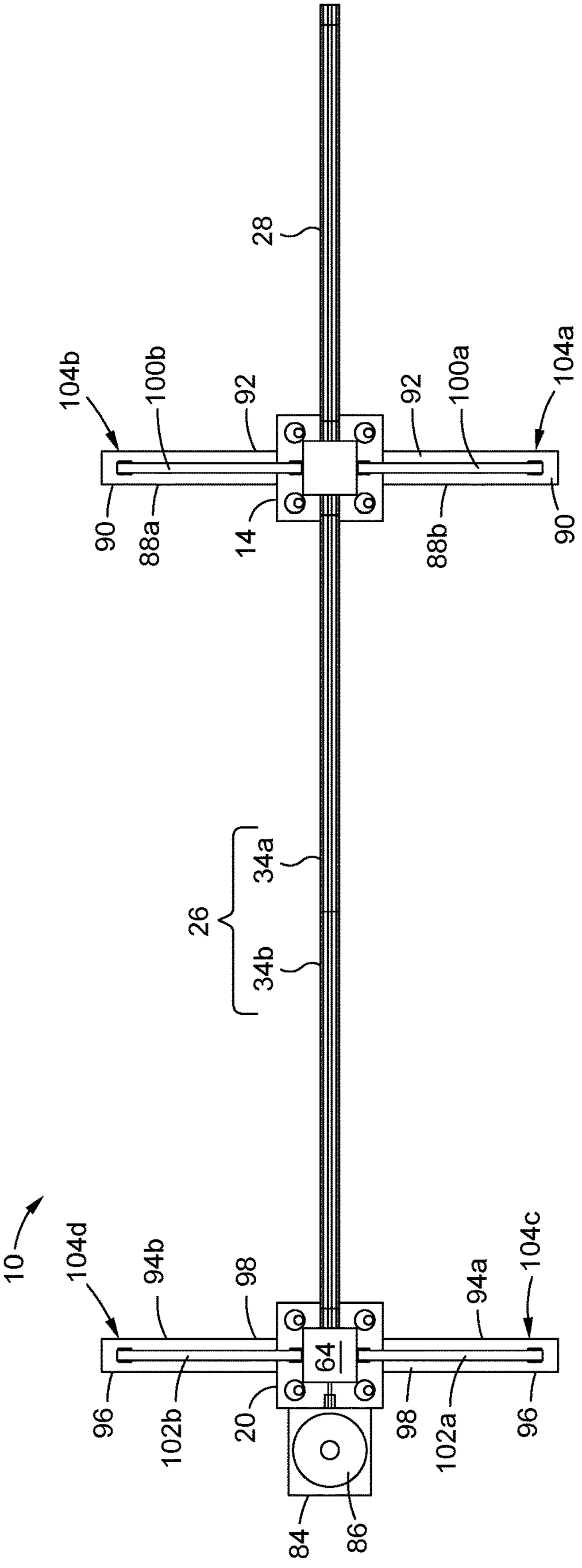
FIG. 7 is a top view of the modular crane system of FIG. 1 as viewed along axis 7-7.
Figure 8:
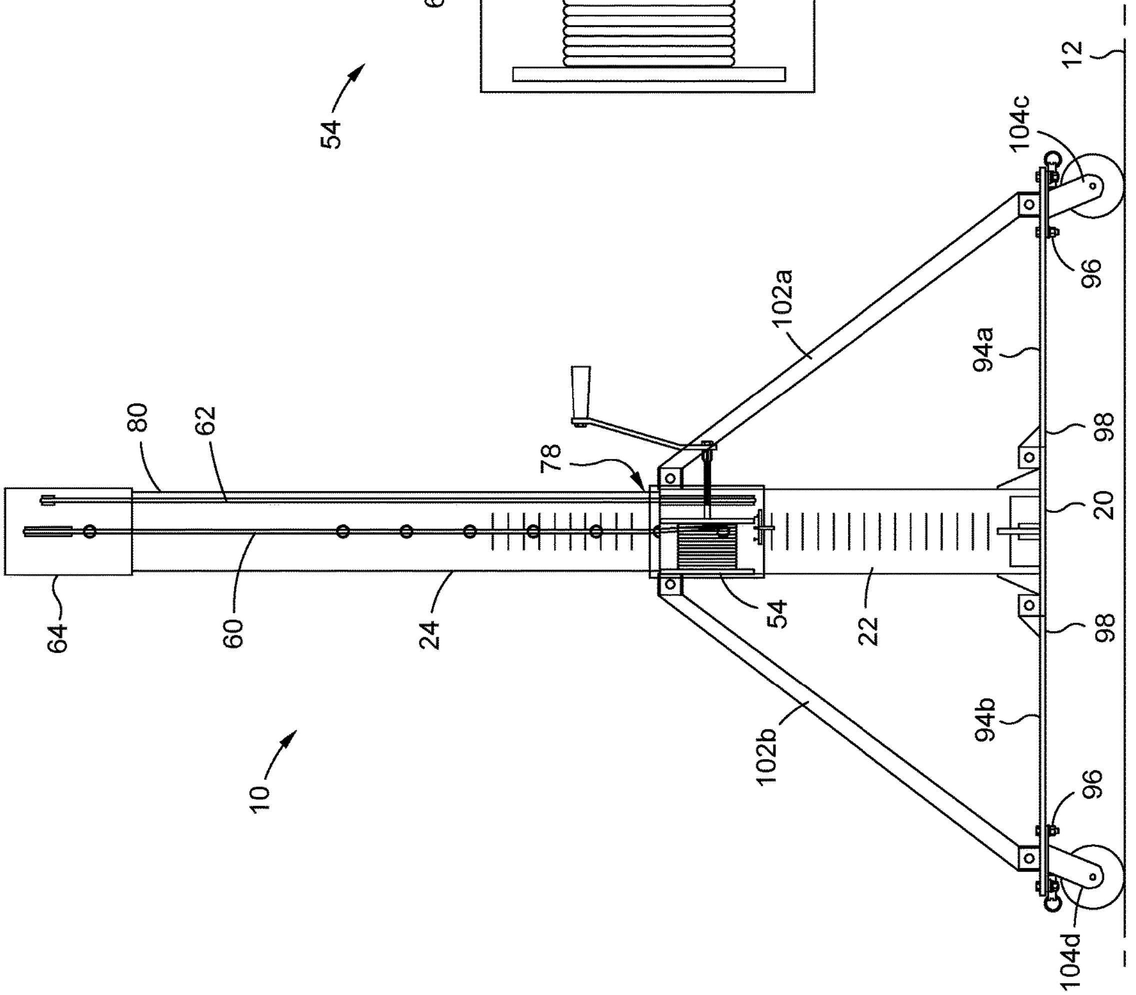
FIG. 8 is an end view of the modular crane system of FIG. 1 as viewed along axis 8-8.

Referring now to FIG. 1 there is depicted a side view of an overhead modular crane system 10 according to an aspect of the present invention. The crane system 10 is deployed upon a floor 12. As used herein the term floor 12 is used to refer to any supportive surface upon which the cane system 10 is disposed upon, attached or is otherwise supported. FIG. 7 is a top view of the modular crane system of FIG. 1 as viewed along axis 7-7, and FIG. 8 is an end view of the modular crane system of FIG. 1 as viewed along axis 8-8. The crane system 10 of this embodiment is depicted in a particular configuration. As will be discussed in detail below it is contemplated that the various components may be reconfigured for a variety of purposes as required. In this regard, the crane system 10 is contemplated to be modular in nature. It is contemplated that crane system 10 as depicted in this particular configuration and as presented in other related configurations and embodiments disclosed herein present various novel features as described in detail below.

The general components of the crane system 10 include a first base plate 14, a first central column support 16 extending from the first base plate 14, a first central column 18 attached to the first column support 16, a second base plate 20, a second central column support 22 extending from the second base plate 20, a second central column 24 attached to the second central column support 16, a main track 26 attached to and spanning the first central column 18 and the second central column 24, a crane track 28 extending from the first central column 18, and a trolley 30 sized and configured to traverse along the main track 26.

Figure 2:
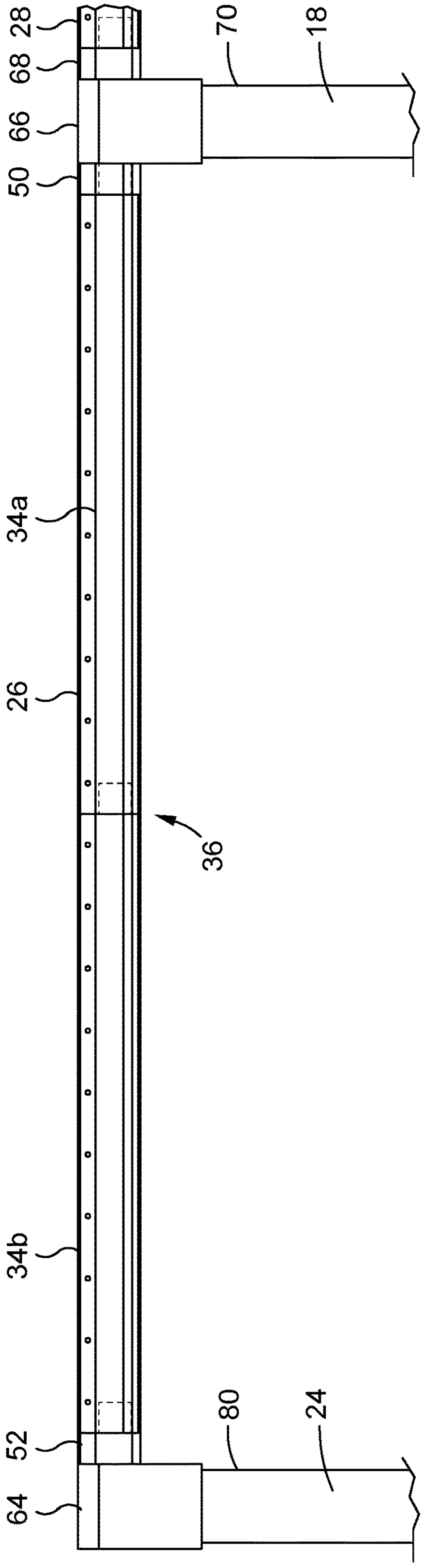
FIG. 2 is an enlarged side view of a portion of the modular crane system of FIG. 1 depicting a main track.
Figure 3:
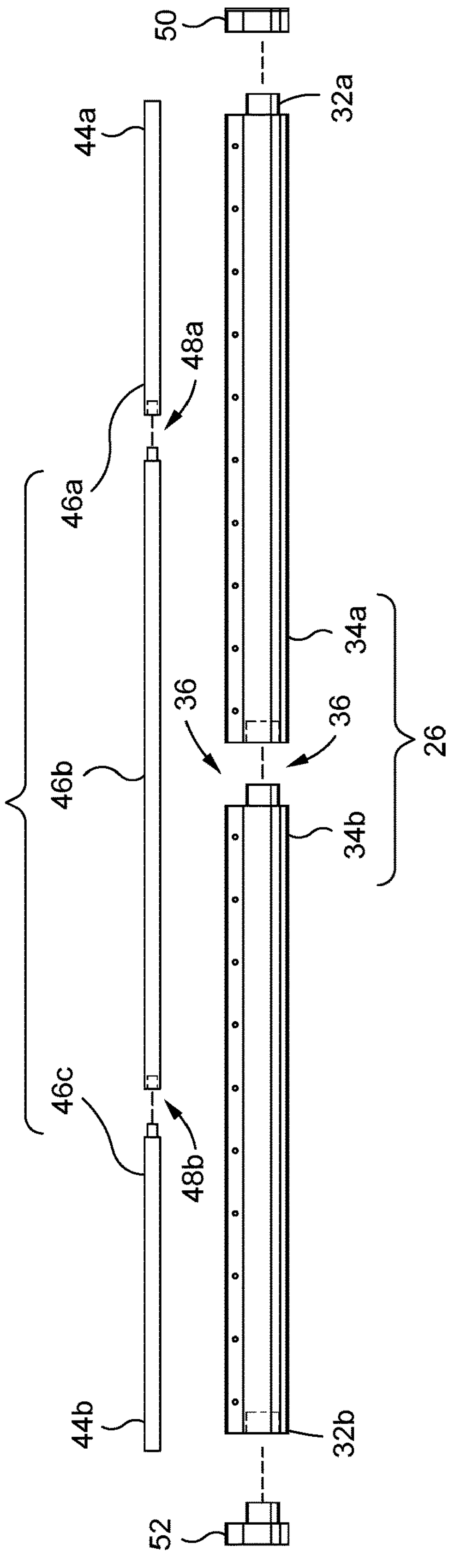
FIG. 3 is an exploded side view of a portion of the modular crane system of FIG. 2.
Figures 4, 5, 6:
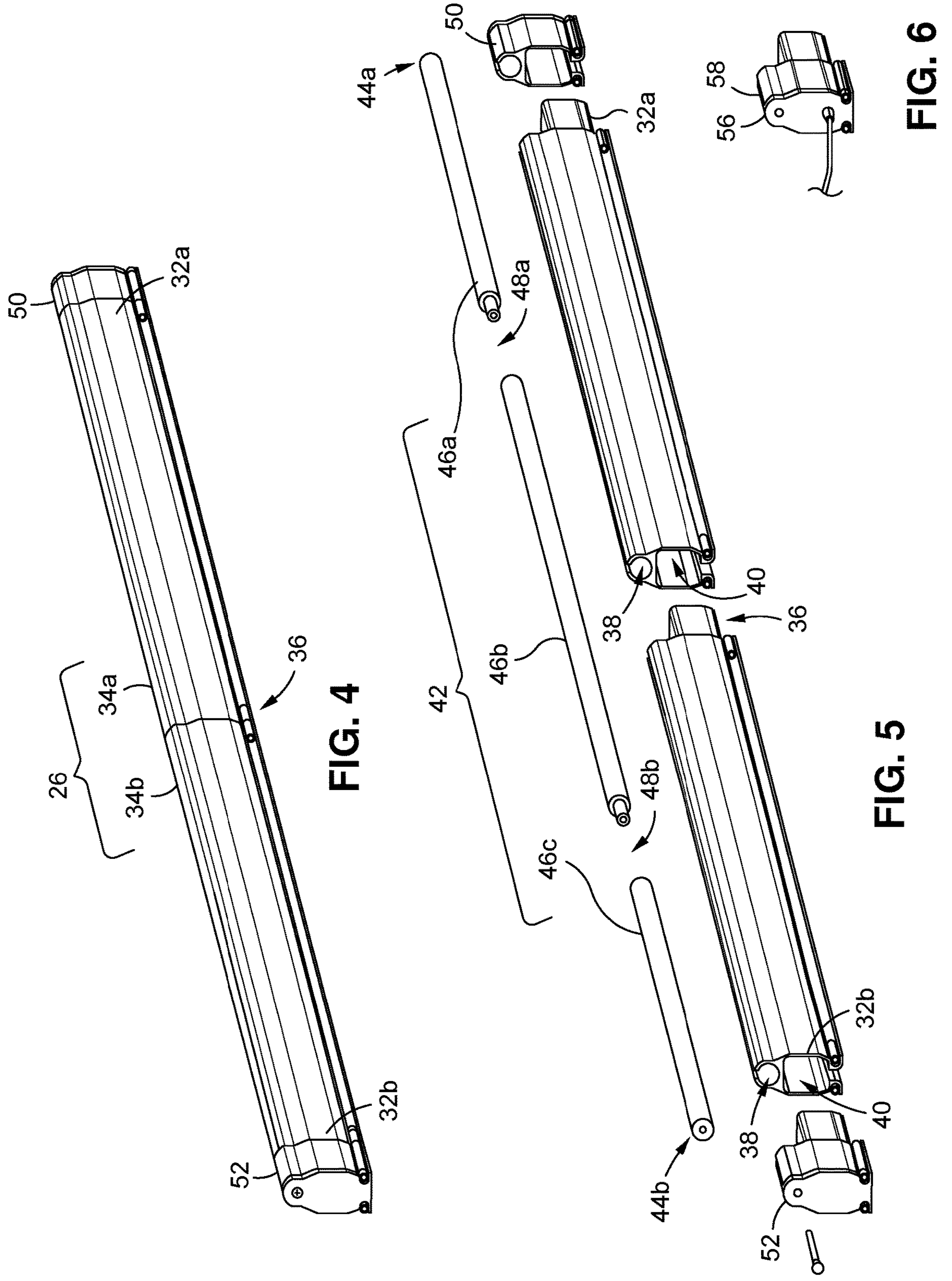
FIG. 4 is a perspective view of a portion of the modular crane system of FIG. 2.
FIG. 5 is an exploded perspective view of the modular crane system of FIG. 4.
FIG. 6 is a perspective view of an alternative embodiment of an end cap having an electrical component.

Referring additionally to FIG. 2 there is depicted an enlarged side view of a portion of the modular crane system 10 of FIG. 1. FIG. 3 is an exploded side view of a portion of the modular crane system 10 of FIG. 2. FIG. 4 is a perspective view of a portion of the modular crane system of FIG. 2. FIG. 5 is an exploded perspective view of the modular crane system of FIG. 4.

In accordance with one embodiment, there is provided the overhead modular crane system 10. The crane system includes 10 the main track 26 having opposing track ends 32*a-b*. The main track 26 includes at least two elongate track sections 34*a-b*. Each of the track sections 34*a-b* is endwise connectable to an abutting track section 34*a-b*. The track sections 34*a-b* are endwise connected to each other and defining a track joint 36 thereat. The main track 26 further includes a stiffener passage 38 extending between the track ends 32*a-b* and through each of the track sections 34*a-b*. The main track 26 further includes a track channel 40 extending between the track ends 32*a-b* and through each of the track sections 34*a-b*. The track channel 40 is open away from the stiffener passage 38. The crane system 10 further includes a top cord stiffener 42 having opposing stiffener ends 44*a-b*. The top cord stiffener 42 is disposed in and through the stiffener passage 38. The stiffener ends 44*a-b* are respectively aligned with the track ends 32*a-b*. The top cord stiffener 44 includes at least three elongate stiffener sections 46*a-c*. Each of the stiffener sections 46*a-c* is endwise connectable to an abutting stiffener section 46*a-c*. The stiffener sections 46*a-c* are endwise connected to each other and define stiffener joints 48*a-b* thereat. None of the stiffener joints 48*a-b* is aligned with the track joint 36.

As mentioned above, each of the track sections 34*a-b* is endwise connectable to an abutting track section 34*a-b*. It is contemplated that more than two such track section 34*a-b* may be utilized as needed to satisfy any overall length requirements of the main track 26. In this regard, additional track sections 34*a-b* may be added to readily expand the main track 26 in a modular manner.

While it is recognized that the main track 26 may be expanded in this manner, a weak point of the overall main track 26 is at the track joint 36 or additional track joints created with additional track sections. The top cord stiffener 42 is used to structurally strengthen the main track 26 at the track joint 26 (and any others). However, as the expansion of the main track 26 is based upon the modular nature of the track sections 34*a-b*, the top cord stiffener 42 is also modular as it is composed of multiple stiffener sections 46*a-c*. Additional stiffener sections 46 may be added as needed. It is recognized that weak points of the top cord stiffener 42 are at the stiffener joints 48*a-b*. As such, stiffener joints 48*a-b* are specifically configured such that none of the stiffener joints 48*a-b* is aligned with the track joint 36 to ensure that these weak points are not coincident.

It is contemplated that the track sections 34 need not be of a same length as depicted in this embodiment and may come in a variety of lengths as may be needed to reconfigure the crane system according to job requirements. Likewise, the stiffener sections 46 need not be of a same length as depicted in this embodiment and may come in a variety of lengths as may be needed to reconfigure the crane system according to job requirement and so that the overall length of the top cord stiffener 42 matches the overall length of the main track 26. It is contemplated that a consideration for the particular sizing of these track sections 34 and stiffener sections 46 is whether such components and others of the crane system 10 may be readily and efficiently shipped through common carrier services, such as overnight delivery courier services (such as the longer lengths of sections being on the order of 5 to 6 feet long). In this respect an entire crane system 10, or expansion components to an existing deployed crane system 10 or replacement parts may be sized to be readily shipped and delivered to a user. The track sections 34 and stiffener sections 46 may be formed of any of those materials and constructed according to those methods and techniques which are well known to one of ordinary skill in the art, which may include various metals, plastics, composite laminates and combinations thereof. In the preferred embodiments, the modular components are manufactured from a polymer fiber reinforced plastic (FRP), which resists environmental corrosion and does not require painting.

The track sections 34*a-b* may be attached to each other through press fit engagement. However, the track sections 34*a-b* may be connected according to any of those techniques which are well known to one of ordinary skill in the art. The stiffener sections 46*a-c* may be attached to each other through threaded engagement. However, the stiffener sections 46*a-c* may be connected according to any of those techniques which are well known to one of ordinary skill in the art.

The overall vertical height of the crane system 10 may be adjustable. In this regard, the first central column 18 may be secured within the first column support 16 at various longitudinal positions to result in various lengths of the combination of the first central column 18 and the first column support 16. Similarly, the second central column support 24 may be secured within the second column support 22 at various longitudinal positions to result in various longitudinal lengths of the combination of the second central column 24 and the second column support 22. These adjustments to the longitudinal lengths may be used to position the track sections 34*a-b* at a desired vertical height. Various reference indicia may be placed on the first column support 16, the first central column 18, the second column support 22, and the second central column support 24 to indicate the various longitudinal positions as corresponding to the vertical height of the crane system 10 or any component thereof, such as the track sections 34*a-b*. With reference to FIG. 8, an example of such reference indicia is depicted on the second column support 22, and the second central column support 24.

In accordance with various embodiments, the crane system 10 may further include a pair of end caps 50, 52. Each end cap 50, 52 is sized and configured to receive a stiffener section 46 therein and a track section 34 therein. The end caps 50, 52 are attached to the main track 26 with the main track 26 disposed between the end caps 50, 52. The end cap 50 is attached to the track end 32*a*, and the end cap 52 is attached to the track end 32*b*. The end caps 50, 52 are attached to the top cord stiffener 42 with the top cord stiffener 42 disposed between the end caps 50, 52. The end cap 50 is attached to the stiffener end 44a, and the end cap 52 is attached to the stiffener end 44*b*. In this regard, the end caps, 50, 52 are used to securely join the track end 32*a* with the stiffener end 44*a* and the track end 32*b* with the stiffener end 44*b*. The main track 26 and the top cord stiffener 42 may be press fit with end caps 50, 52.

The crane system 10 may include the trolley 30 engaged with the main track 26. The trolley 30 is sized and configured to traverse along the track channel 40. The trolley 30 provides locomotion via internal wheels that make contact internally with the main track 26. In the embodiment depicted, there is provided a trolley winch 54 as will be discussed further below. However, it is contemplated that in another embodiment the crane system 10 may further include an electric motor 56 in electrical communication with the trolley 30 for selectively traversing the trolley 30 along the track channel 40. FIG. 6 depicts an end cap 58 that includes an integrated electrical component, such as the electric motor 56 or power supply for powering an electric motor on-board the trolley 30 (not shown).

Figure 9:
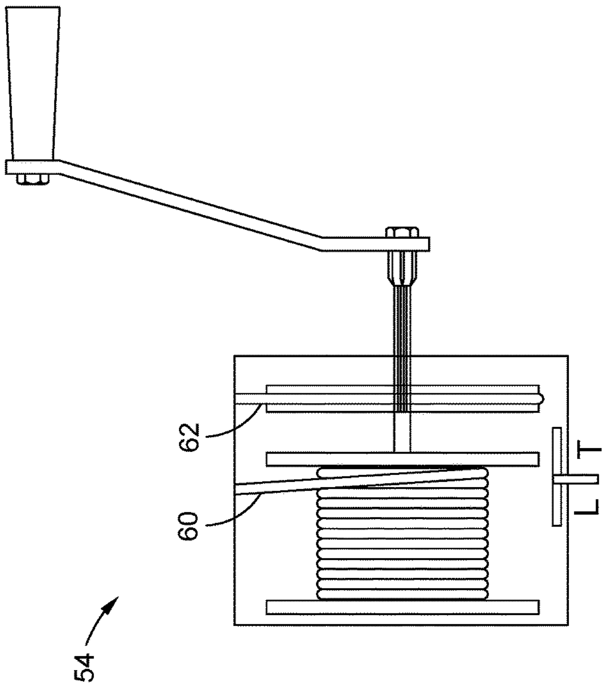
FIG. 9 is an enlarged view of a trolley winch as depicted in FIG. 8.

Referring additionally to FIG. 9 there is depicted an enlarged view of the trolley winch 54 as depicted in FIG. 8. The crane system 10 may further include a lift cable 60 engaged with the trolley 30 and extending from the trolley 30 away from the track channel 40. The lift cable 60 is used to support a load as required. The trolley winch 54 may be used to selective move the lift cable 60 so as to adjust the height of any attached load. The crane system 10 may further include a traverse cable 62. In this embodiment the traverse cable 62 is engaged with the trolley winch 54 and the trolley 30 to selectively traverse the trolley 30 along the track channel 40.

An elbow connector 64 may be provided to engage the end cap 52 and the second central column 24 to connect the second central column 24 to the main track 26. A T-connector 66 may also be provided that is engaged with the end cap 50 and the first central column 18 to connect the first central column 18 to the main track 26. Further, an end cap 68 may be provided that is also engaged with the T-connector 66 to connect crane track 28 to the main track 26 and the first central column 18.

According to another aspect of the invention, there is provided a crane base support system for use with a parapet wall (not depicted) extending vertically from the floor 12. The crane base support system includes the first base plate 14 positionable adjacent the floor 12. The crane base support system further includes the first central column 18 extending from the first base plate 14. The first central column 18 includes a base end 68 attached to the first base plate 14 and a crane end 70 disposed away from the first base plate 14. The crane base support system further includes a parapet wall clamp 72 attached to and extending laterally from the first central column 18 (as depicted in FIG. 1). The parapet wall clamp 72 has a jaw 74 with a jaw opening 76 facing generally towards the first base plate 14. The jaw opening 76 is sized and configured to receive and engage the parapet wall. The crane base support system further includes the second base plate 20 positionable adjacent the floor 12. The crane base support system further includes the second central column 24 extending from the second base plate 20. The second central column 24 includes a base end 78 attached to the second base plate 20 and a track end 80 disposed away from the second base plate 20. The crane base support system further includes the main track 26 disposed between the first and second central columns 18, 24. The main track 26 is attached to the crane end 70 of the first central column 18 and attached to the track end 80 of the second central column 24.

In accordance with various embodiments, the crane base support system may further include the elongate crane track 28 attached to the crane end 70 of the first central column 18. This may be via the end cap 68 and T-connector 66. The crane track 70 may extend generally in a same direction of the parapet wall clamp 72 and away from the main track 26. The crane base support system may further include the trolley 30 engaged with the crane track 28, and the trolley 30 may be sized and configured to traverse along the elongate crane track 28. The parapet wall clamp 72 may include a clamp arm 82 attached to the central column 18 and disposed between the first central column 18 and the jaw 74. The parapet wall clamp 72 may be selectively laterally positionable from the first central column 18 for adjusting a distance of the jaw 74 from the first central column 18. The parapet wall clamp 74 may be selectively laterally positionable along the first central column 18 for adjusting a height of the jaw 74 from the floor 12. The crane base support system may further include a counter-weight support 84 and a counter-weight 86. The counter-weight support 84 may be removeably attached to the second base plate 20, and the counter-weight 86 may be disposed upon the counter-weight support 84.

Figure 11:
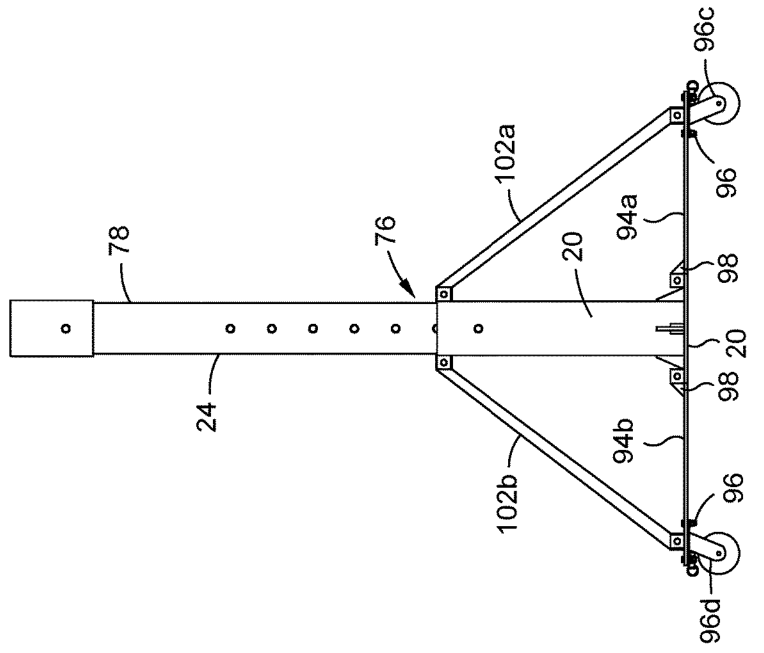
FIG. 11 is an assembled view of the portion of the modular crane system of FIG. 10.
Figure 10:
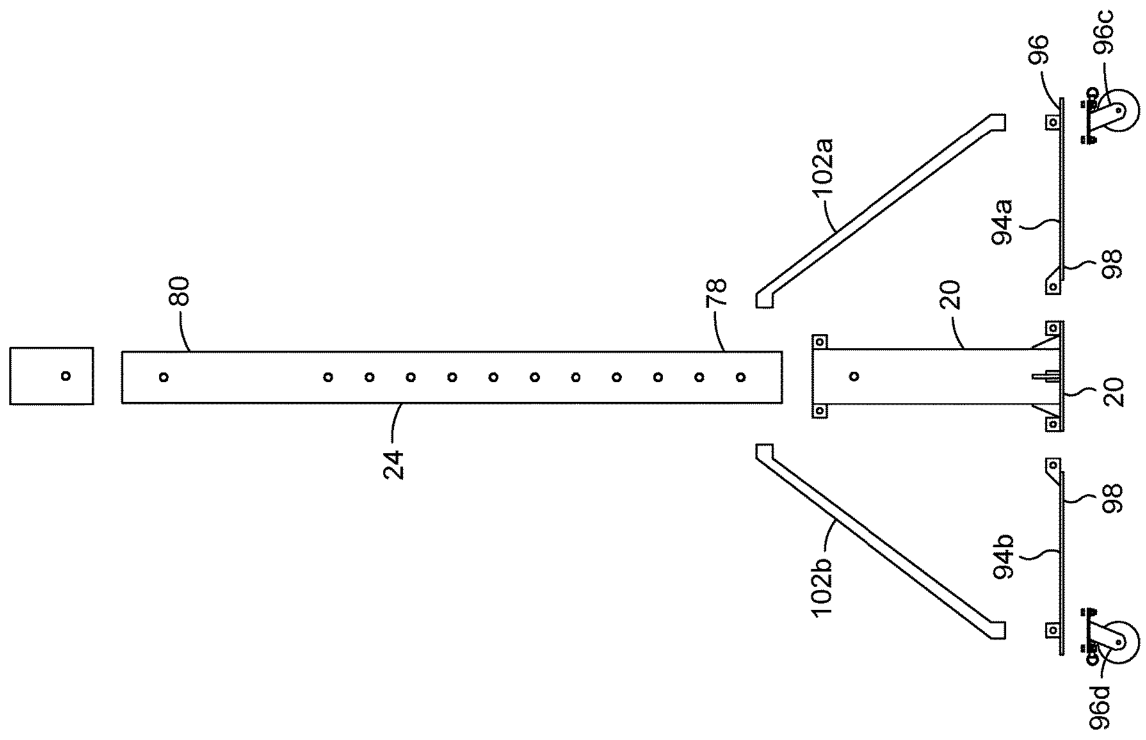
FIG. 10 is an exploded end view of the modular crane system as depicted in FIG. 8 (as depicted without the trolley winch and cables)

Referring additionally to FIG. 10, there is depicted an exploded end view of the modular crane system 10 as depicted in FIG. 8 (as depicted without the trolley winch 54 and cables 60, 62. FIG. 11 is an assembled view of the portion of the modular crane system 10 of FIG. 10.

The crane base support system may further include first support legs 88*a-b* each having a distal end 90 and an attachment end 92. The attachment end 92 of each of the first support legs 88*a-b* is attached the first base plate 14 and with the distal ends 90 extendable along the floor 12 and away from the first base plate 14. The crane base support system further includes second support legs 94*a-b* each having a distal end 96 and an attachment end 98. The attachment end 98 of each of the second support legs 94*a-b* is attached to the second base plate 20 and with the distal ends 96 extendable along the floor 12 and away from the second base plate 20.

The crane base support system 10 may include first angle braces100*a-b* and second angle braces 102*a-b*. The first angle braces 100*a-b* are attached to the respective ones of the distal ends 90 of the first support legs 88*a-b*. The first angle braces 100*a-b* are further attached to the first central column 18. The second angle braces 102*a-b* are attached to the respective ones of the distal ends 96 of the second support legs 94*a-b*. The second angle braces 102*a-b* are further attached to the second central column 24. In this regard, the first support legs 88*a-b*, the corresponding first angle braces 100*a-b* and the first central column 18 form a structural triangle to rigidly extend the first support legs 88*a-b* from the first base plate 14. Likewise, the second support legs 94*a-b*, the corresponding second angle braces 102*a-b* and the second central column 24 form a structural triangle to rigidly extend the second support legs 94*a-b* from the second base plate 20. The crane base support system may further include casters 104*a-d* attached to the distal ends 90, 96 of the first and second support legs 88*a-b*, 94*a-b*.

Figure 13:
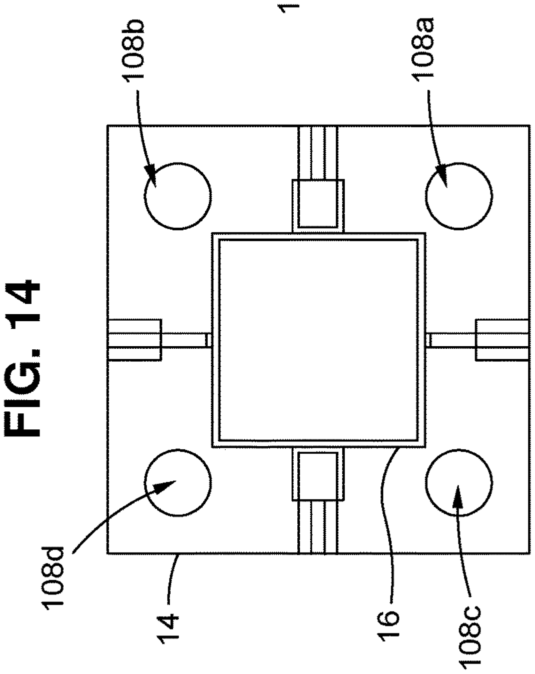
FIG. 13 is a top view of the base plate and the central column support of FIG. 12.
Figure 12:
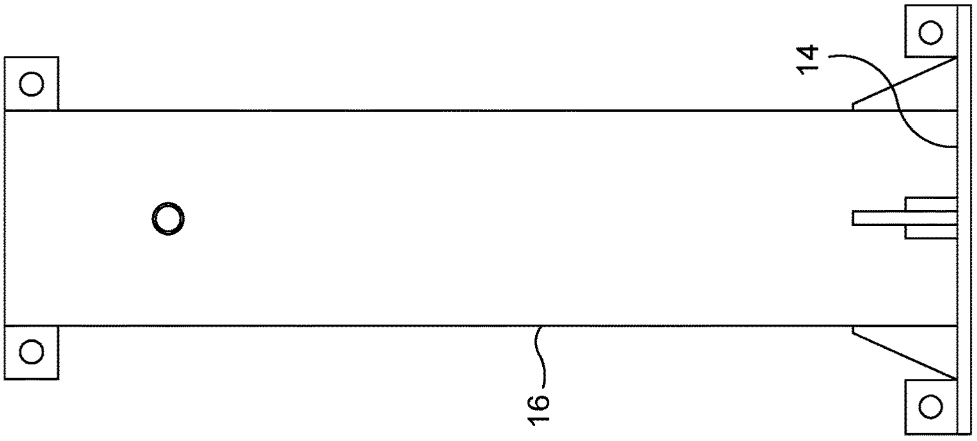
FIG. 12 is an end view of a base plate and an attached central column support of the modular crane system of FIG. 11.

Referring now to FIG. 12 is an end view of the first base plate 14 and the attached first central column support 16 of FIG. 11. FIG. 13 is a top view of the first base plate 14 and the central column support 16 of FIG. 12. According to another aspect of the invention, there is provided a repositionable crane base support system for use with the first central column 18 and anchor bolts (such as anchor bolt 106 depicted in FIGS. 17-20) extending from the floor 12. It is noted that four such anchor bolts 106 are contemplated in the embodiment disclosed herein and are disposed in a general square configuration (although only a single anchor bolt 106 is depicted). Anchor bolts 106 typically include a threaded shaft and are imbedded in a supportive surface such as a concrete floor and are used to securely attach items at such locations. As used herein the term anchor bolt is used to refer to any fastener component extending from a supportive surface.

The crane base support system includes the first base plate 14 and the first central column support 16 extending from the first base plate 14. The first base plate 14 and the first central column support 16 may be integrated and formed from a continuous piece of material. However, the first base plate 14 and the first central column support 16 may be separated formed and later attached. Anchor bolt apertures 108*a-d* are formed through the first based plate 14 and distributed about the first central column support 16. In this embodiment there are four such anchor bolt apertures 108*a-d*. Each of the anchor bolt apertures 108*a-d* correspond to a respective one of the anchor bolts 106. It is contemplated that fewer or more may be anchor bolt apertures 108*a-d* may be used depending upon the number of anchor bolts 106 that may available and loading requirements.

Figure 15:
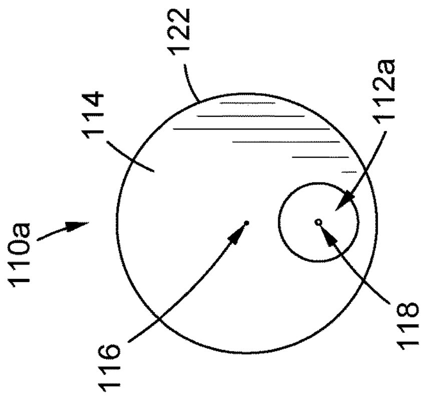
FIG. 15 is an enlarged top view of a circular cap of FIG. 14.
Figure 16:
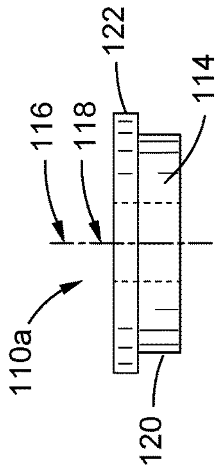
FIG. 16 is a side view of the circular cap of FIG. 15.
Figure 14:
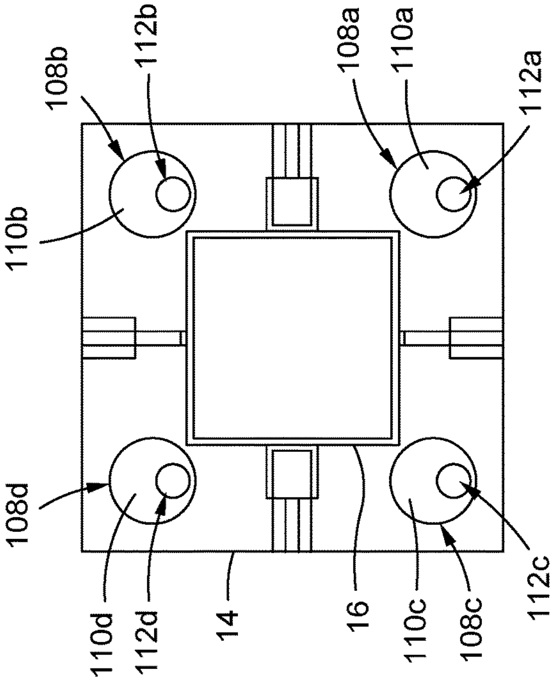
FIG. 14 is the top view of the base plate and the central column support of FIG. 13 with circular caps.

Referring additionally to FIG. 14, there is depicted a top view of the first base plate 14 and the central column support 16 of FIG. 13 with circular caps 110*a-d*. FIG. 15 is an enlarged top view of the circular cap 110*a* of FIG. 14, and FIG. 16 is a side view of the circular cap 110*a* of FIG. 15. In this regard, the crane base support system further includes the circular caps 110*a-d*. The circular caps 110*a-d* are cooperatively sized and configured with the corresponding anchor bolt apertures 108*a-d*. The circular caps 110*a-d* are positioned within a respective one of the anchor bolt apertures 108*a-d* and rotatable therein. Each circular cap 110*a-d* includes a bolt hole 112*a-d* sized and configured to receive an anchor bolt 106 therethrough. Each bolt hole 112*a-d* is off-set from a center of each respective circular cap 110a-d. Advantageously, it is contemplated that off-set nature of the bolt holes 112a-d, allows for minor horizontal adjustments (x and y) to align the bolt holes 112*a-d* on an individual basis. This is significant as often the anchor bolts 106 may not be in a perfect configuration to align with any pre-fabricated bolt hole pattern.

In accordance with various embodiments, each circular cap110*a-d* may include a cap body 114 extending along a cap central longitudinal axis 116. Each bolt hole 112*a-d* is defined by a bolt hole central longitudinal axis 118 disposed parallel to and offset from the associated central cap longitudinal axis 116 (as best depicted in the top view of FIG. 15). The cap body 114 may have a cap body outer surface 120 with each bolt hole 112*a-d* being non-concentrically disposed through the cap body 114 with respect to the cap body outer surface 120. Each circular cap 110*a-d* may further include a flanged lip 122 extending radially from the cap body 114, and each cap body 114 may be disposed in a corresponding one of the anchor bolt apertures 108*a-d*.

Figure 17:
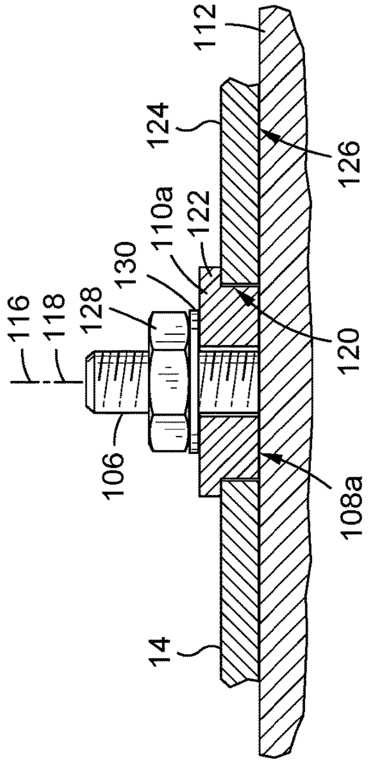
FIG. 17 is a cross-sectional side view of a portion of a base plate with a circular cap as engaged with an anchor bolt and a floor as secured with a nut and washer according to an aspect of the present invention.
Figure 18:
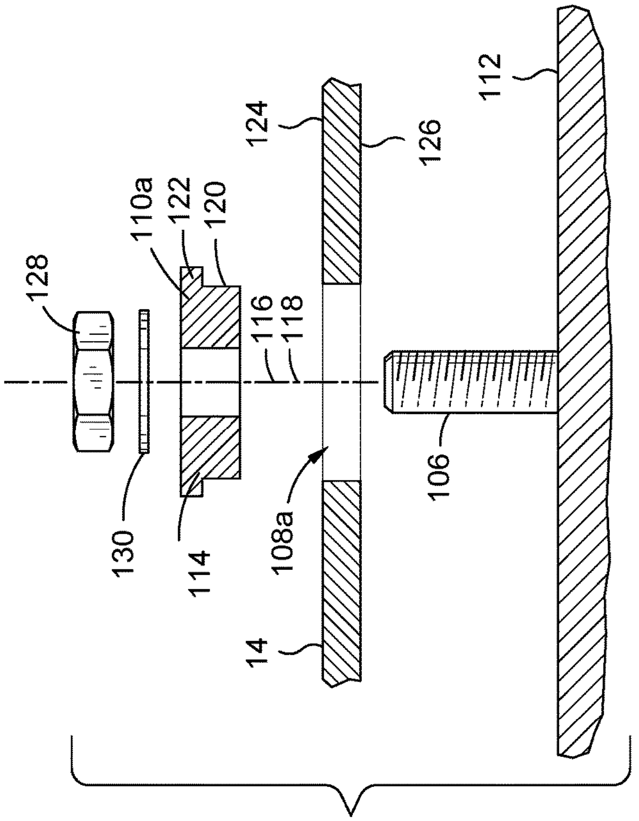
FIG. 18 is an exploded cross-sectional side view of FIG. 17.

Referring additionally to FIG. 17 there is depicted a cross-sectional side view of a portion of the first base plate 14 with a circular cap 110*a* as engaged with the anchor bolt 106 and the floor 12 as secured with a nut 128 and a washer 130 according to an aspect of the present invention. FIG. 18 depicts an exploded cross-sectional side view of FIG. 17. The first base plate 14 may include a base plate top side 124 and an opposing base plate bottom side 126. Each circular cap 110*a-d* may be positionable in a corresponding one of the anchor bolt apertures 108*a-d* with the flanged lip 122 disposed against the base plate top side 124 with the first base plate 14 disposed upon the floor 12.

Figure 19:
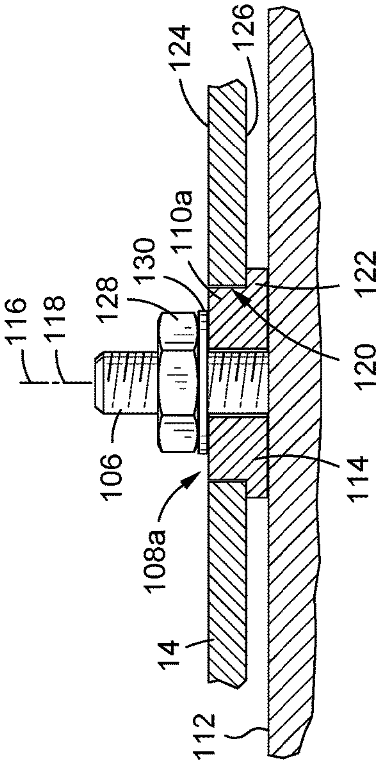
FIG. 19 is a cross-sectional side view of the portion of the base plate with the circular cap (as flipped over) of FIG. 17.
Figure 20:
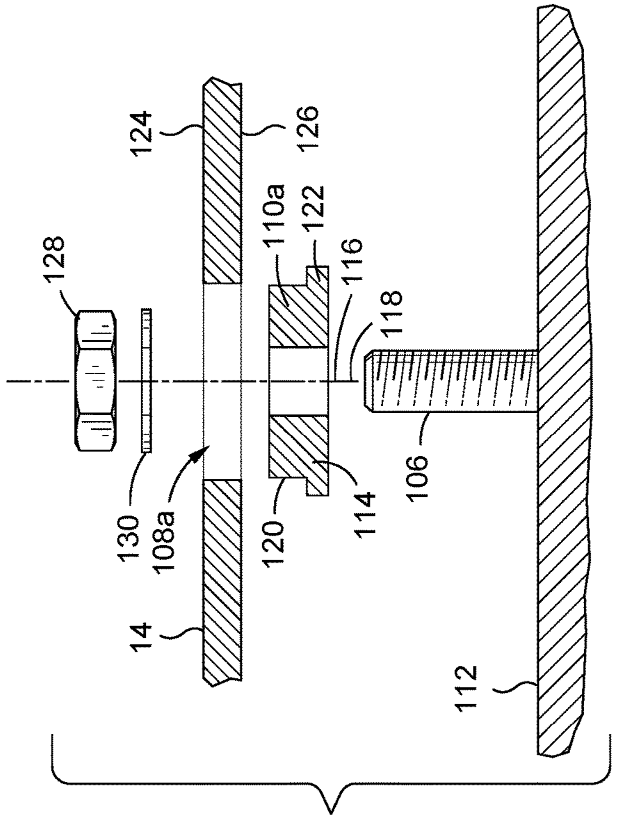
FIG. 20 is an exploded cross-sectional side view of FIG. 19.

With additional reference to FIG. 19, there is depicted a cross-sectional side view of the portion of the first base plate 14 with the circular cap 110*a* (as flipped over) of FIG. 17. FIG. 20 is an exploded cross-sectional side view of FIG. 19. Each circular cap 110*a-d* is positionable in a corresponding one of the anchor bolt apertures 108*a-d* with the flanged lip 122 disposed against the base plate bottom side 126 with the flanged lip 122 upon the floor 12. In this regard, the first base plate 14 may be elevated off of the floor 12 as may be required based upon the operator needs. No additional spacers are needed to facilitate such elevation because the circular caps 110*a-d* are used to engage the anchor bolts 106 regardless of whichever side the circular caps 110*a-d* are flipped. As such, the circular caps 112*a-d* may be used to effect positional adjustments in all horizontal and vertical directions.

While the nut 128 and the washer 130 are used in this particular embodiment with the threaded anchor bolts 106, it is contemplated that any fastener or fastener component that are known to one of ordinary skill in the art may be used. In addition, such fasteners allow the base plate to be easily disposed in a level orientation upon a support surface.

Figure 21:
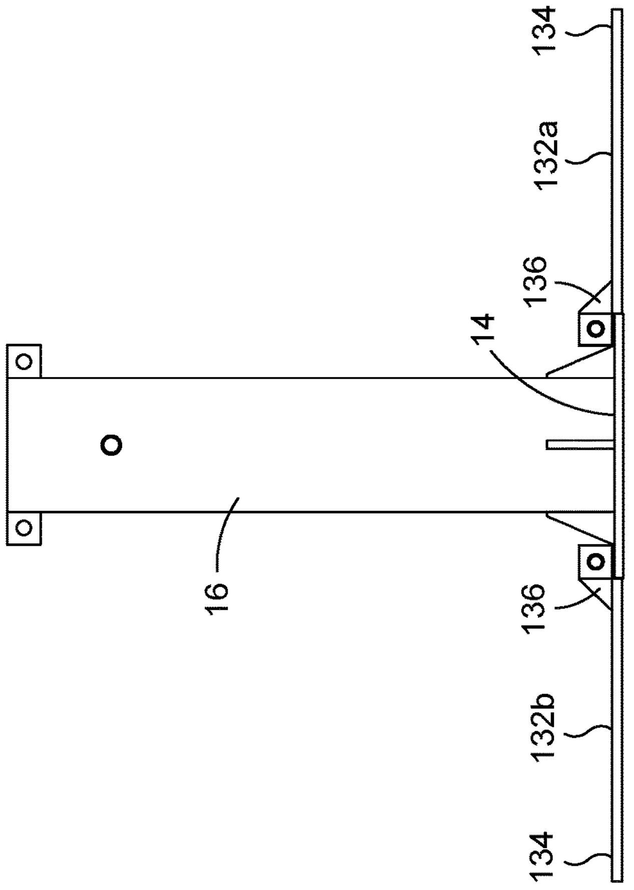
FIG. 21 is a side view of a base plate and an attached central column support with support legs according to another embodiment of the present invention.
Figure 22:
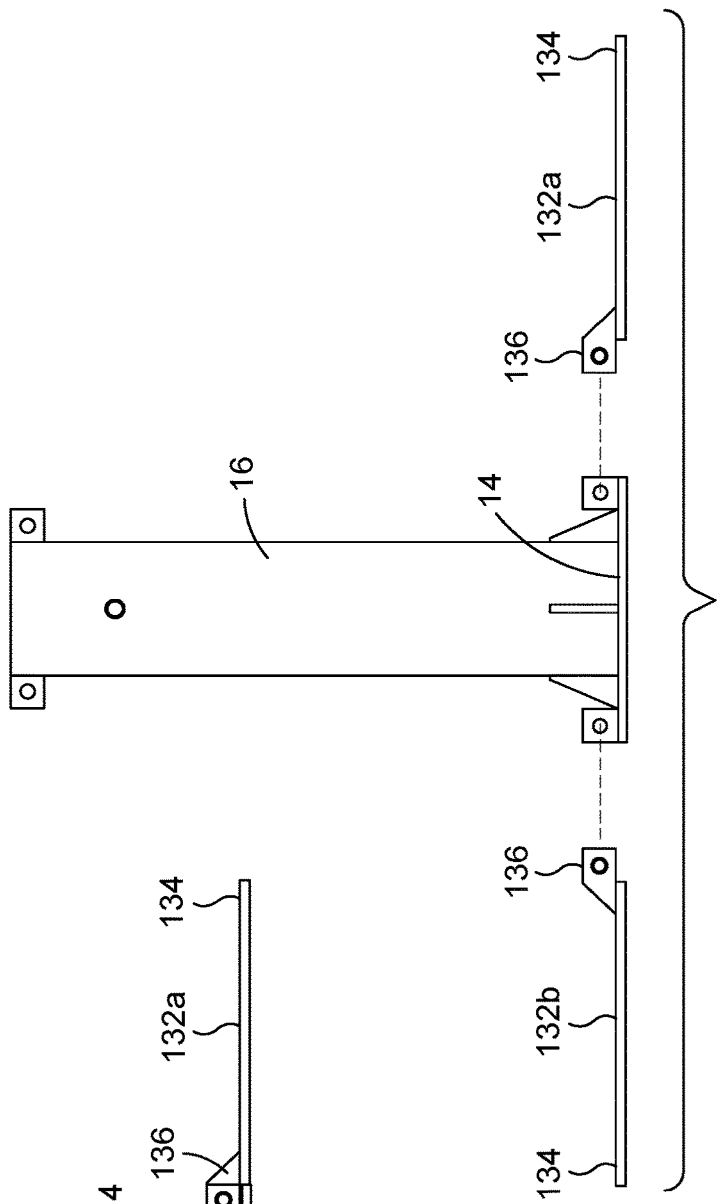
FIG. 22 is an exploded side view of the base plate, the central column support and the support legs of FIG. 21.

Referring now to FIG. 21 is a side view of the first base plate 14 and the attached first central column support 16 with support legs 132*a-b* according to another embodiment of the present invention. FIG. 22 is an exploded side view of the first base plate 14, the first central column support 16 and the support legs 132*a-b* of FIG. 21. Each of the support legs 132a-b may have a distal end 134 and an attachment end 136. The attachment end 136 of each of the support legs 132*a-b* may be attached to the first base plate 16 and with the distal ends 134 extendable along the floor 12 away from the first base plate 16. The support legs 132*a-b* may be deployed directly upon the floor 12 and provide additional structural support as may be required beyond the attachment forces of the anchor bolts 106.

Figure 23:
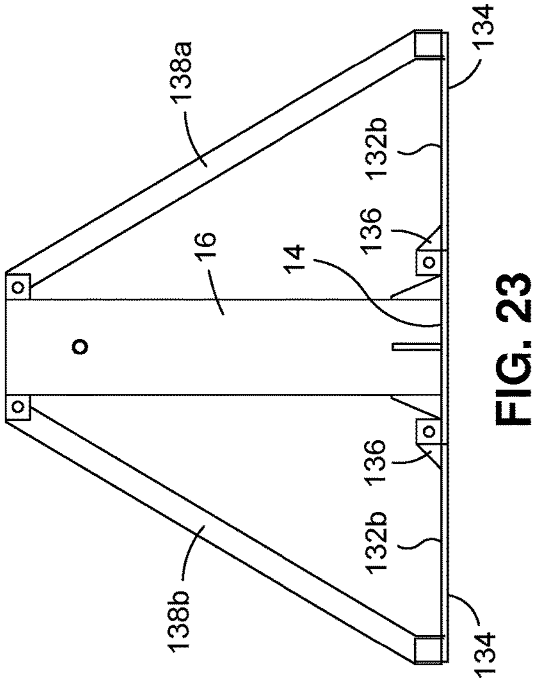
FIG. 23 is a side view of a base plate and an attached central column support with support legs and angle braces according to another embodiment of the present invention.
Figure 24:
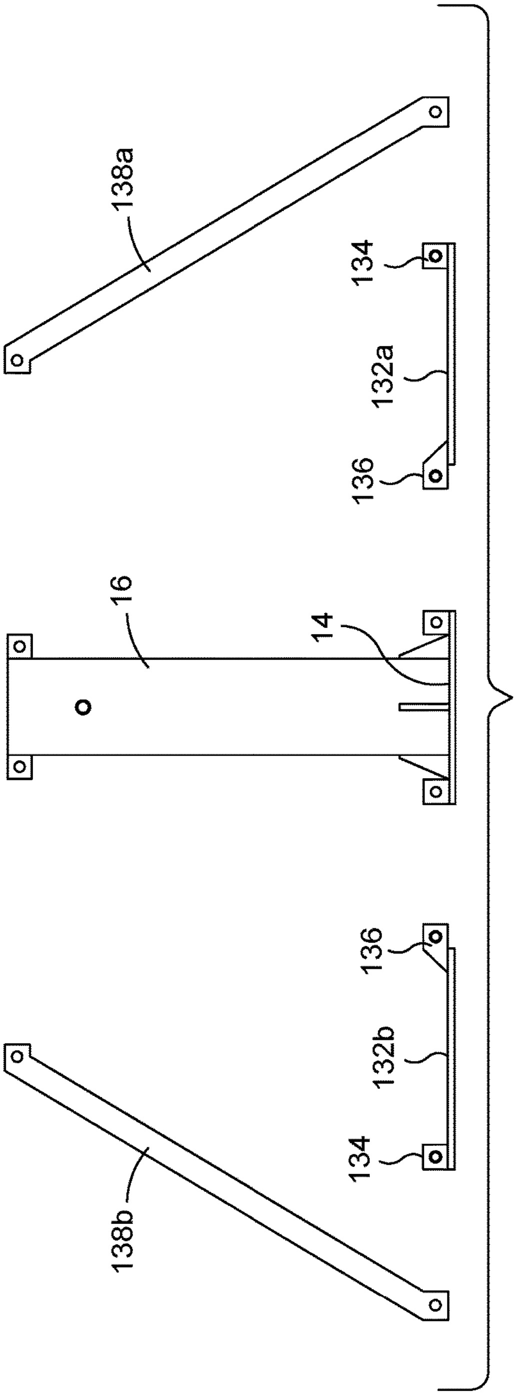
FIG. 24 is an exploded side view of the base plate, the central column support, the support legs and the angle braces of FIG. 23.

With additional reference to FIG. 23, there is depicted a side view of the first base plate 16 and the attached central column support 18 with the support legs 132*a-b* and angle braces 138*a-b* according to another embodiment of the present invention. FIG. 24 is an exploded side view of the first base plate 16, the first central column support 18, the support legs 132*a-b* and the angle braces 138*a-b* of FIG. 23. The crane base support system may further include the angle braces 138*a-b* corresponding to each support leg 132a-b, each angle brace 138*a-b* is attached to the distal end 134 of the corresponding support leg 132*a-b* and the first central column support 16. As indicated above, the first central column 18 is engaged with the first central column support 16. In this regard, the angle braces 138 may be connected to the first central column 18 via the first central column support 16 as depicted, or connected directly (no shown).

Figure 26:
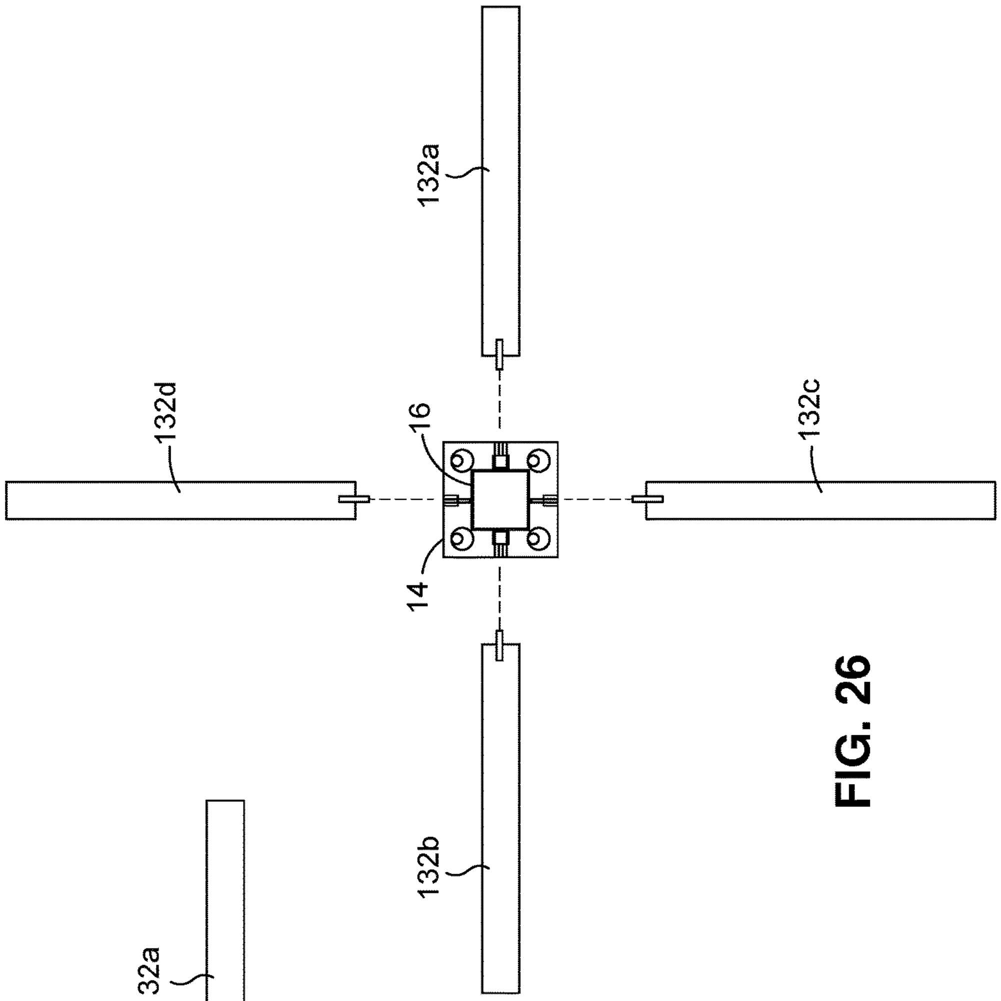
FIG. 26 is an exploded top view of the base plate, the central column support, and the support legs of FIG. 25.
Figure 25:
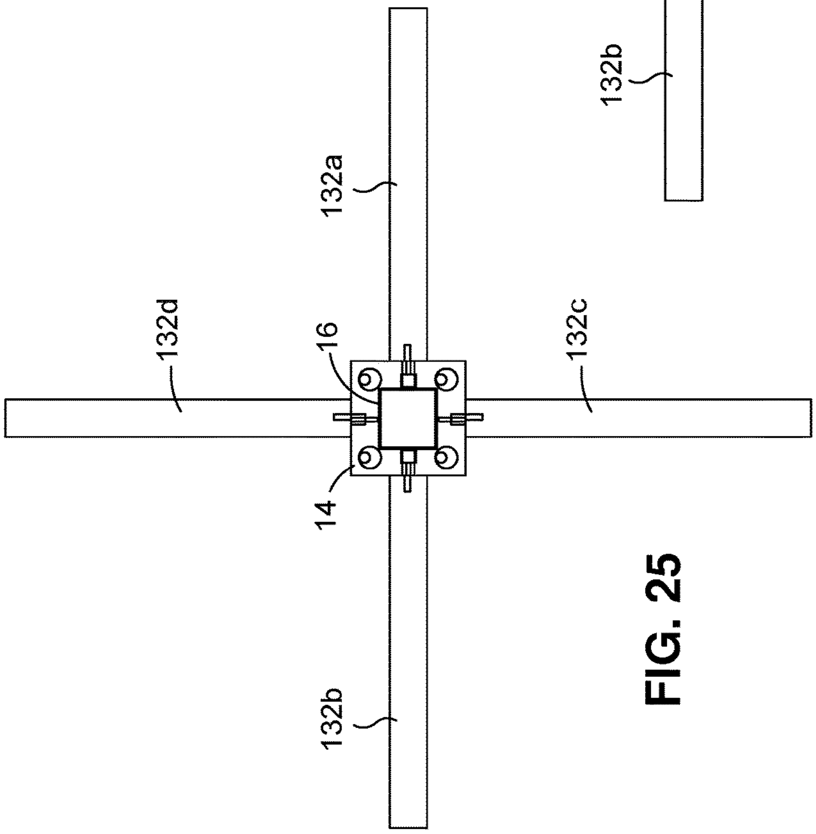
FIG. 25 is a top view of a base plate and an attached central column support with support legs according to another embodiment of the present invention.

Referring additionally to FIG. 25 there is depicted a top view of the first base plate 14 and the attached central column support 16 with support legs 132*a-d*. FIG. 26 is an exploded top view of the firs base plate 14, the first central column support 16, and the support legs 132*a-d* of FIG. 25. In this regard the additional support legs 132c-d may be added as needed.

Figure 27:
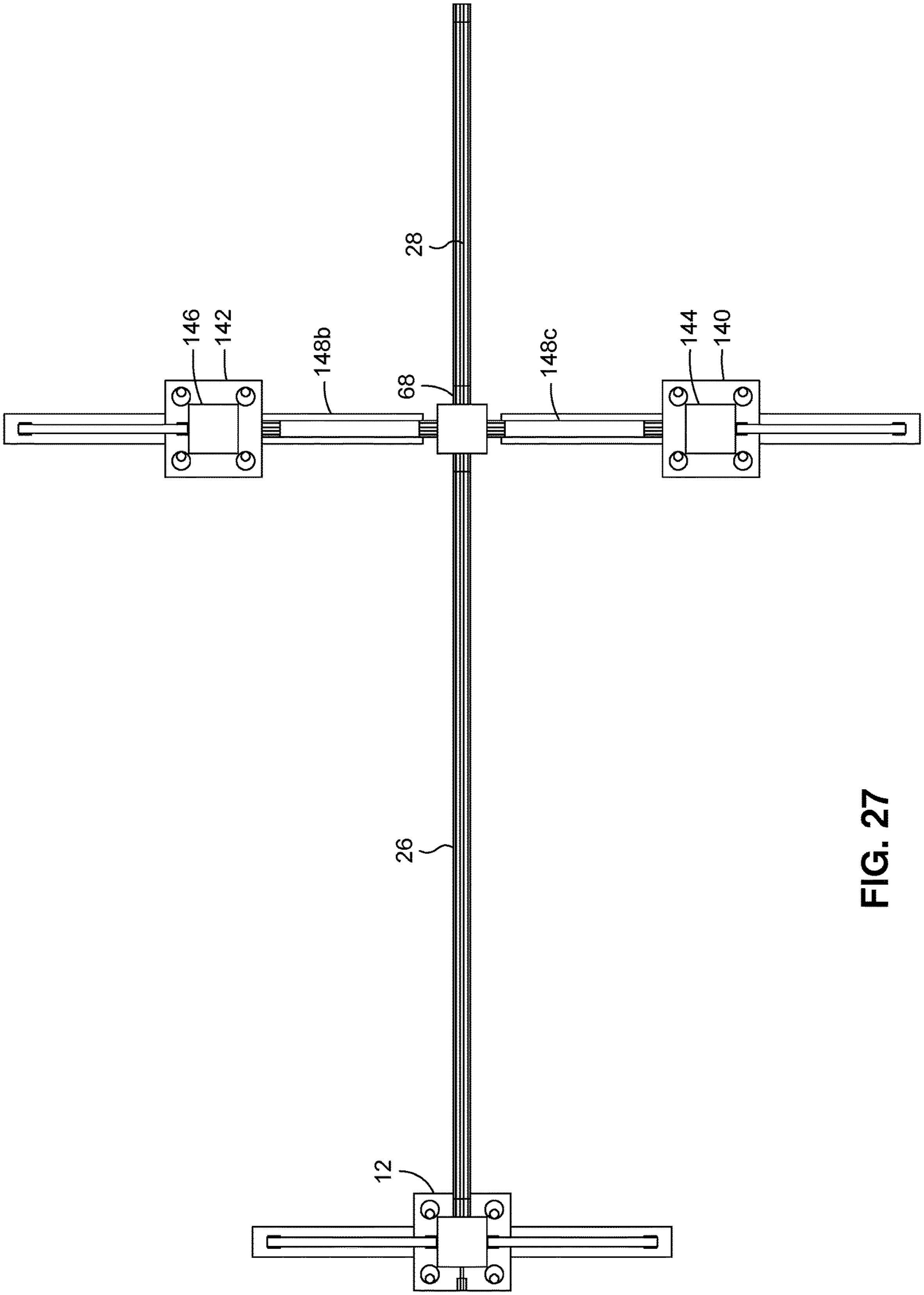
FIG. 27 is a top view of a modular crane system according to another embodiment of the present invention.
Figure 28:
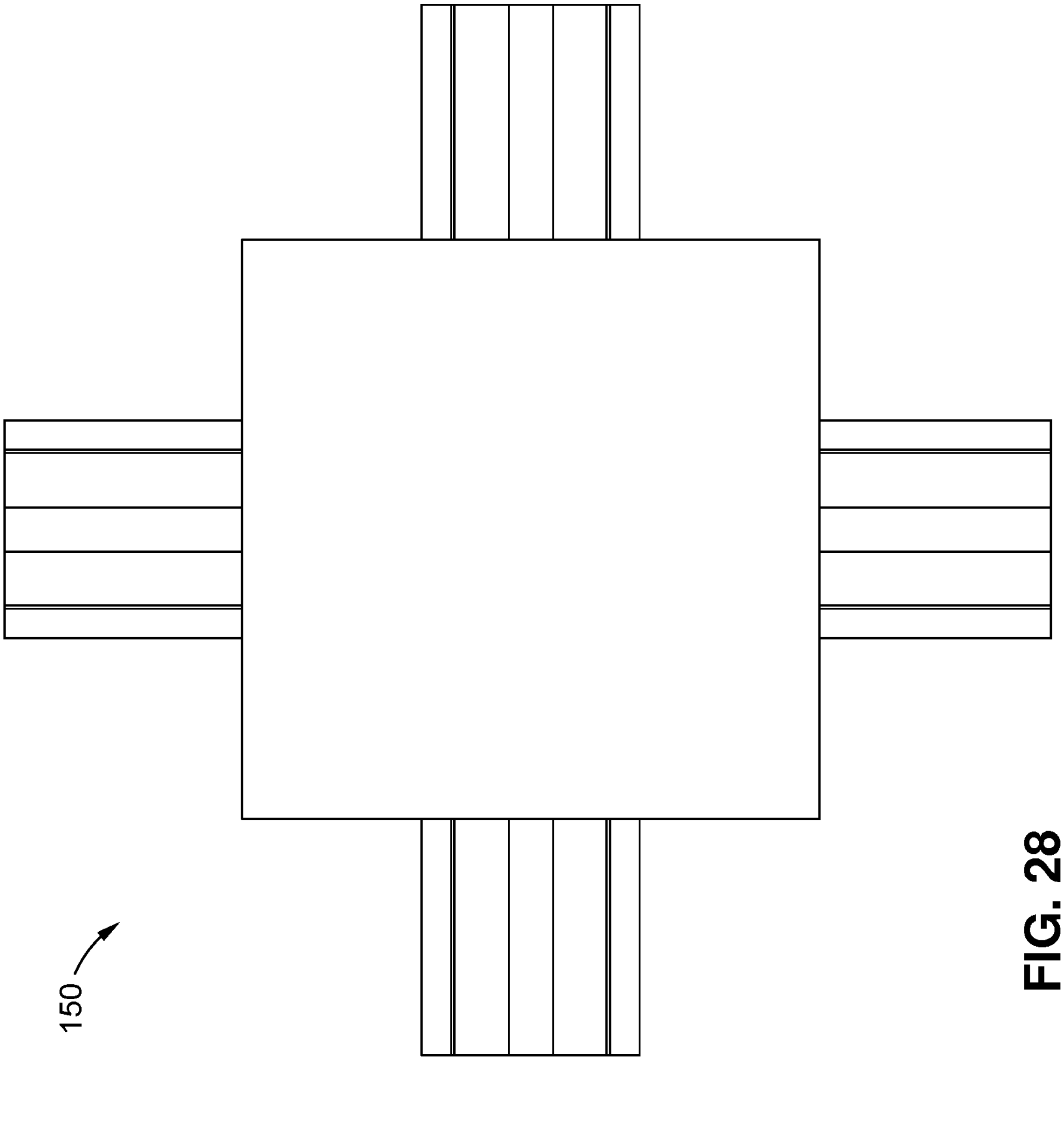
FIG. 28 is top view of a central track connector of the crane system of FIG. 27.

According to another embodiment, the modular crane system may be reconfigured to utilize many of the same modular components as described above and provide additional crane arrangements. As an example, FIG. 27 depicts another such crane configuration in a top view of a modular crane system according to another embodiment of the present invention. Same reference numerals are used to indicate same components as describe above. In is embodiment there is provided third and fourth base plates 140, 142. The third and fourth base plates 140, 142 may be constructed like the first base plate 14. There are provided third and fourth central column supports 144, 146 respectively extend from the third and fourth base plates 140, 142. Central columns (not shown) are provided that are respectively associated with the third and fourth central column supports 144, 146. Top cross bars 148*a-b* may respectively extend from each central column. A central tract connector 150 may be provided that is used to centrally connect such central columns associated with the third and fourth base plates 140, 142, the main track 26, and the crane track 28. FIG. 28 is top view of a central track connector 150 of the crane system of FIG. 27. Such a configuration is contemplated to join the main track 26 with the crane track 28 in a manner that would allow the trolley 30 to traverse between the main track 26 and the crane track 28.

Figure 29:
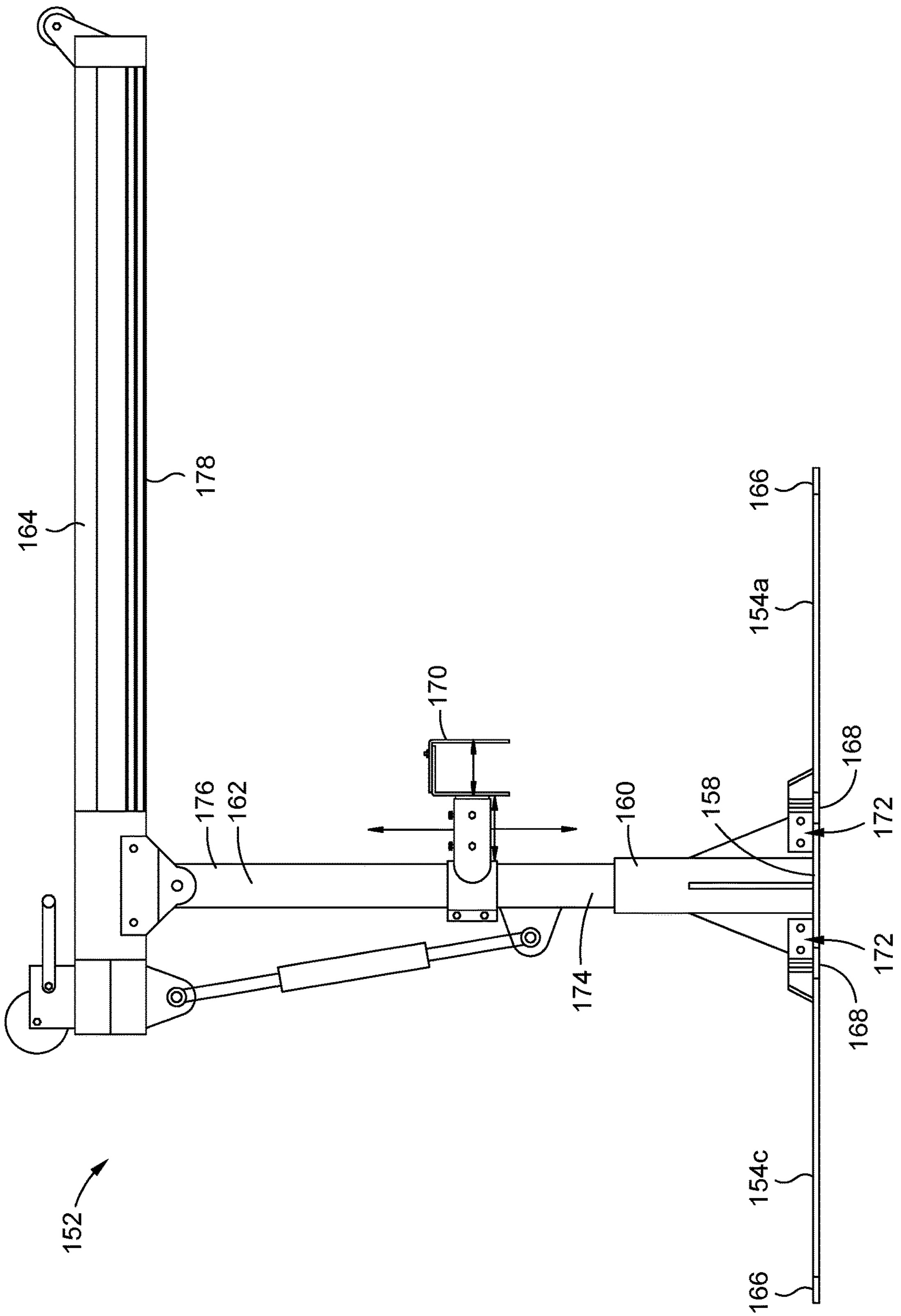
FIG. 29 is a side view of a modular crane system according to another embodiment of the present invention.
Figure 30:
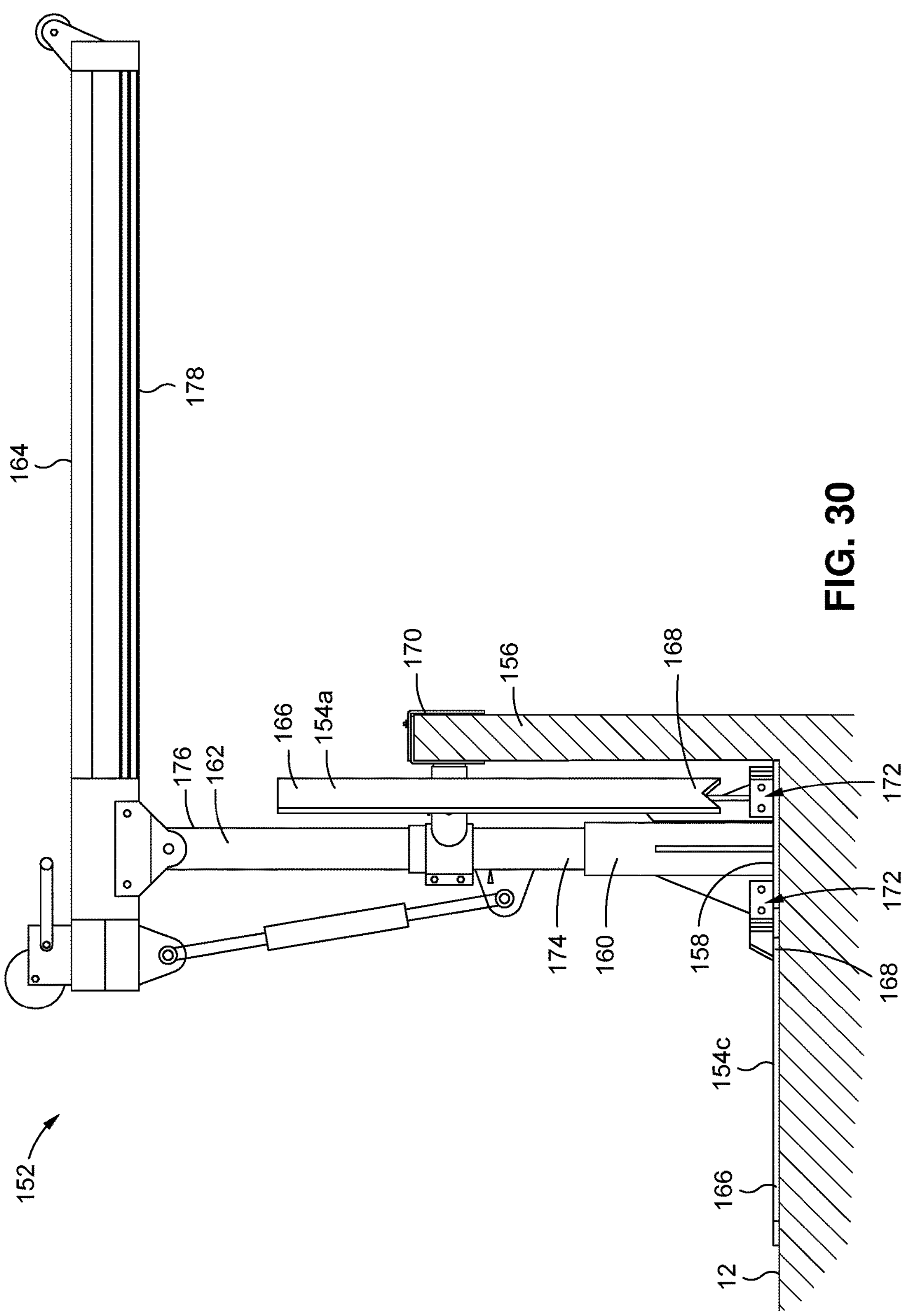
FIG. 30 is a side view of the modular crane system of FIG. 29 with support legs folded as positioned upon a floor and engaged with a parapet wall.
Figure 32:
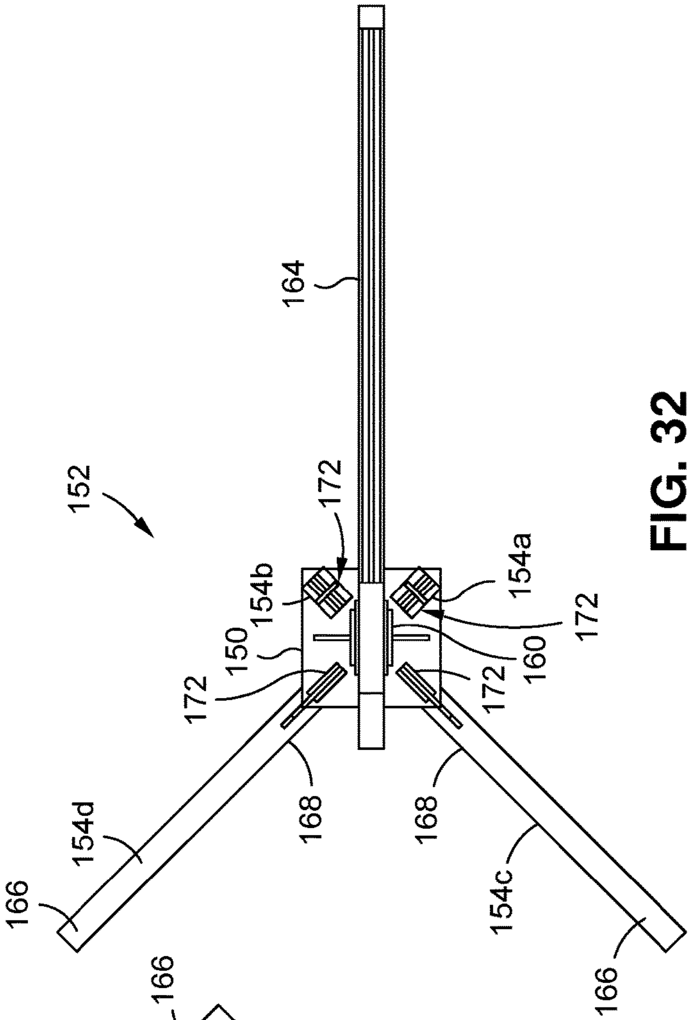
FIG. 32 is a top view of the modular crane system of FIG. 30 with two support legs in a folded position
Figure 31:
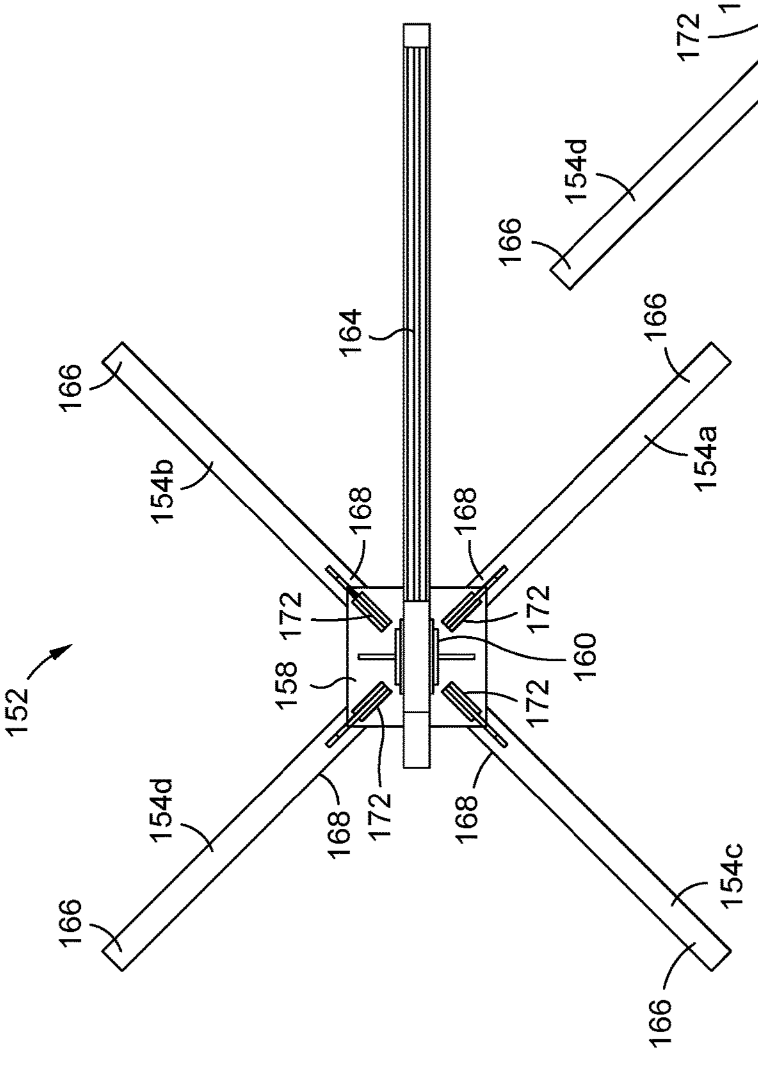
FIG. 31 is a top view of the modular crane system of FIG. 29 the all of the support legs in an extended position.

Referring now to FIGS. 29-32, there is provided a modular crane base support system 152 according to another embodiment of the present invention. Many of the same modular components as described above may be utilized in this embodiment. As such same reference numerals are used to indicate same components as describe above. FIG. 29 depicts a side view of the modular crane base support system 152 that includes support legs 154*a-d*. FIG. 30 is a side view of the modular crane base support system 152 of FIG. 29 with support legs 154*a-b* folded as positioned upon the floor 12 and engaged with a parapet wall 156 that extends vertically from the floor 12. FIG. 31 is a top view of the modular crane system 152 of FIG. 29 the all of the support legs 154 1-d in an extended position. FIG. 32 is a top view of the modular crane system 152 of FIG. 30 with two support legs 154*a-b* in a folded position.

The crane base support system 152 includes a base plate 158 positionable upon the floor 12. The crane base support system 152 may further include a central column support 160 extending from the base plate 158. The crane base support system 152 further includes a central column 162 that may be attached to and supported by the central column support 160 and may extend from the base plate 158 away from the floor 12. The central column support 160 may be configured to rotate about its longitudinal axis. The central column support 160 may be formed of more than one segment which may rotate relative to each other. The crane base support system 152 further includes the support legs 154*a-d* each having a distal end 166 and an attachment end 168.

The attachment end 168 of each of the support legs 154*a-d* is rotatably attached to the base plate 158. The support legs 154*a-d* each have an extended position with the support legs 154*a-d* extending radially from the base plate 158 and a folded position with support legs 154*a-d* extending generally along the central column 162. The crane base support system 152 further includes a parapet wall clamp 170 attached to and extending laterally from the central column. The crane base support system 152 may further include a crane track 164. The base plate 158, the central column support 160, the central column 162, the crane track 164, and parapet wall clamp 170 are respectively similar to the first base plate 14, the first central column support 16, the first central column 18, the crane track 28, and parapet wall clamp 72 as discussed above.

The base plate 158 may have clevis attachment elements 172 generally extending from the base plate 158 in a direction of the central column 162. Each attachment end 168 of the support legs 154*a-d* may be attached to the base plate 158 via rotational engagement with a respective one of the clevis attachment elements 172. The central column 162 may include a base end 174 attached to the base plate 158 and a crane end 176 disposed away from the base plate 158. The base end 174 may be secured and fixed relative to the base plate 158 and the crane end 176 may be configured to rotate about a longitudinal axis. Such rotation allows the crane swing arm capability. The crane base support system 152 may further include an elongate crane track 178 attached to the crane end 176 of the central column 162 and extending generally in a same direction of the parapet wall clamp 170 toward the parapet wall 156. The crane base support system 152 may further include the trolley 30 (as described above) engaged with the crane track 178. The trolley 30 may be sized and configured to traverse along the elongate crane track 178.

Figure 35:
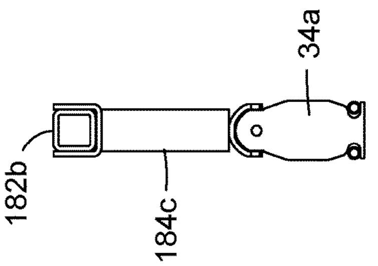
FIG. 35 is an end view of the track section and the truss kit of FIG. 33 as viewed along axis 35-35.
Figure 36:
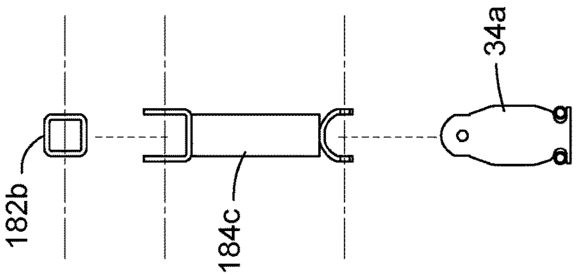
FIG. 36 is an end view of the track section and the truss kit of FIG. 34 as viewed along axis 36-36.
Figure 33:
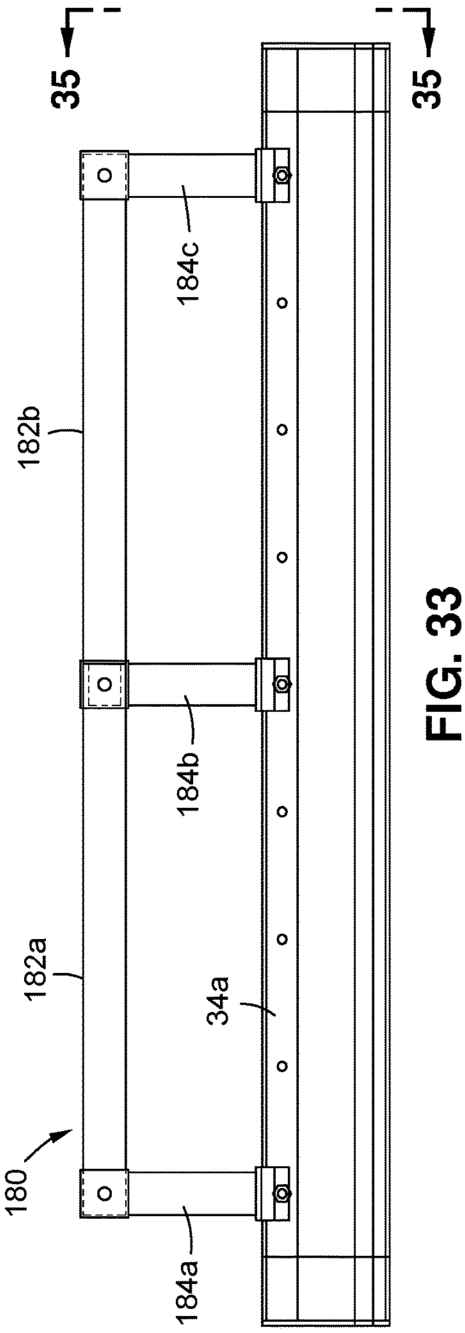
FIG. 33 is a side view of a track section of FIG. 1 with a truss kit attached.
Figure 34:
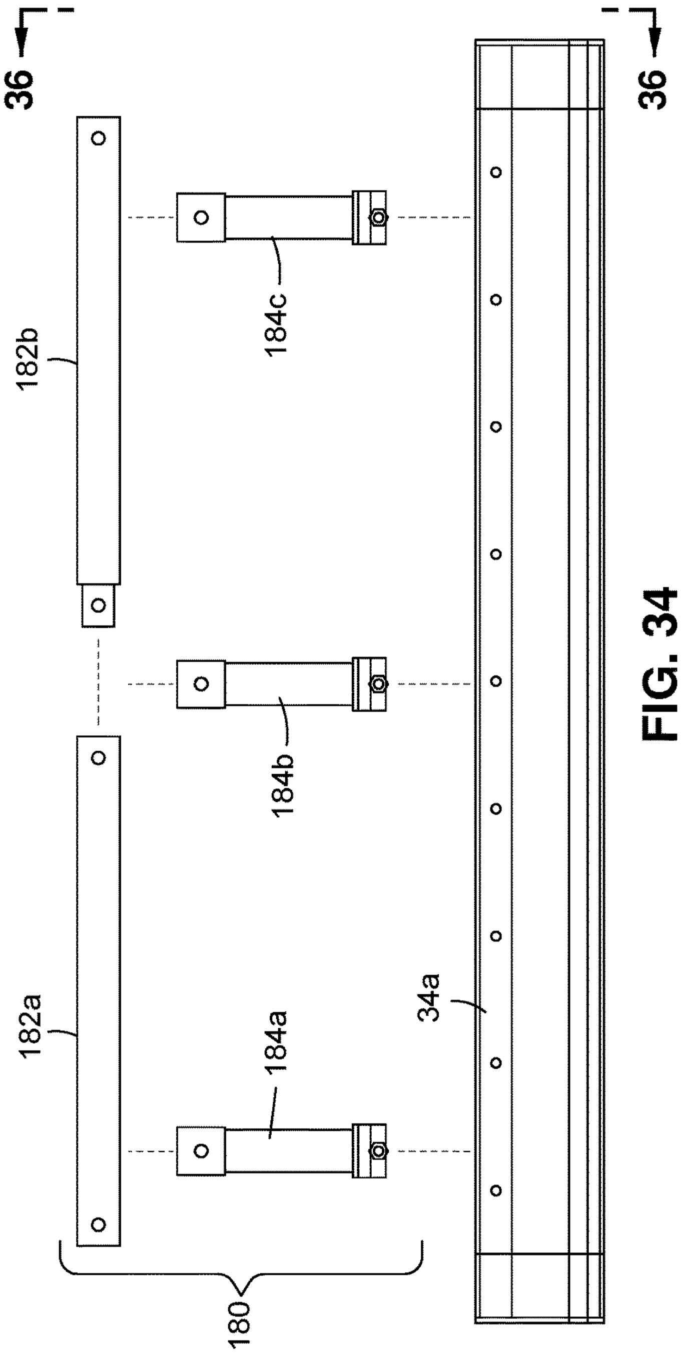
FIG. 34 is a side view of the track section of FIG. 33 with the truss kit exploded from the track section.

Referring now to FIG. 33 is a side view of the track section 34*a* of FIG. 1 with a truss kit 180. FIG. 34 is a side view of the track section 34*a* and the truss kit 180 of FIG. 33 with the truss kit 180 exploded from the track section 34a. FIG. 35 is an end view of the track section 34*a* and the truss kit 180 of FIG. 33, and FIG. 36 is an end view of the track section 34*a* and the truss kit 180 of FIG. 34. The truss kit 180 may include vertical supports 182*a-c* and horizontal supports 184*a-b*. The vertical supports 182*a-c* are attached track section 34*a* and may be attached with fasteners. The vertical supports 182*a-c* are also respectively attached to the horizontal supports 184*a-b*. The vertical support 182*a* is attached to the horizontal support 184*a*. The vertical support 182*b* is attached to both the horizontal supports 184*a-b*. The vertical support 182*c* is attached the horizontal support 184*c*. The vertical supports 182*a-c* and the horizontal supports 184*a-b* are rigidly attached to each other so as to not rotate relative to each other. The vertical supports 182*a-c* are also rigidly attached to the track section 34*a* so as to not rotate relative to each other. With this configuration the attached truss kit 180 forms are truss-like construction with the track section 34*a* so as to substantially increase the lifting and supporting capacity of the track section 34*a*.

Figure 38:
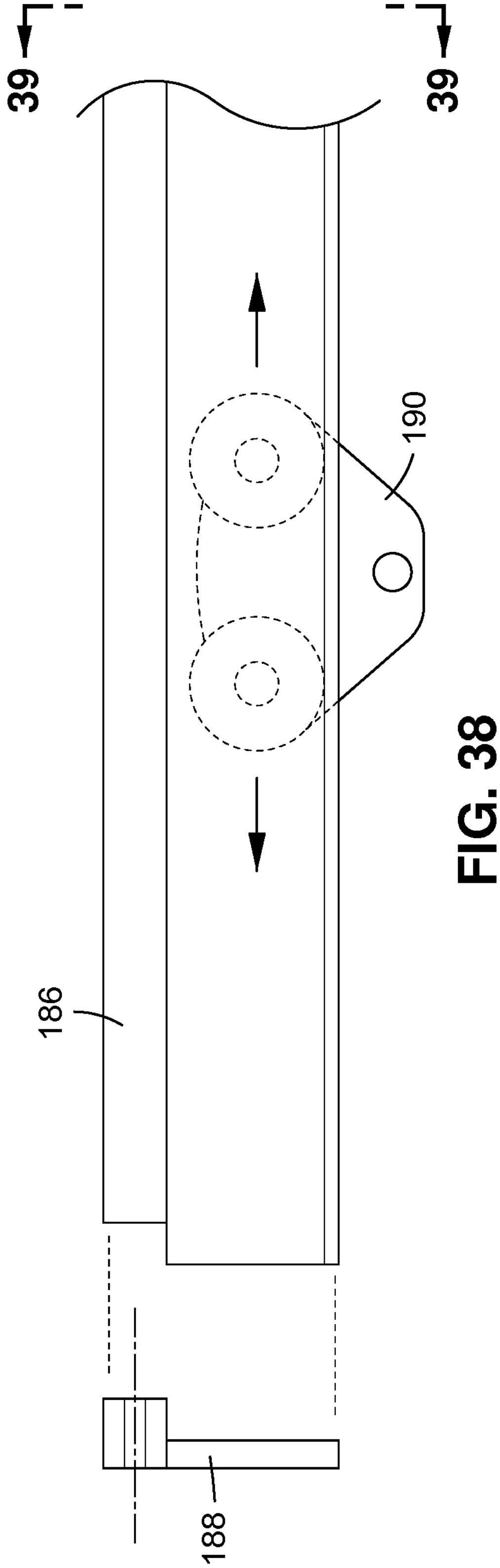
FIG. 38 is the side view of the track section, the end cap and the trolley of FIG. 37 with the end cap exploded from the track section and the trolley positioned along the track section.
Figure 37:
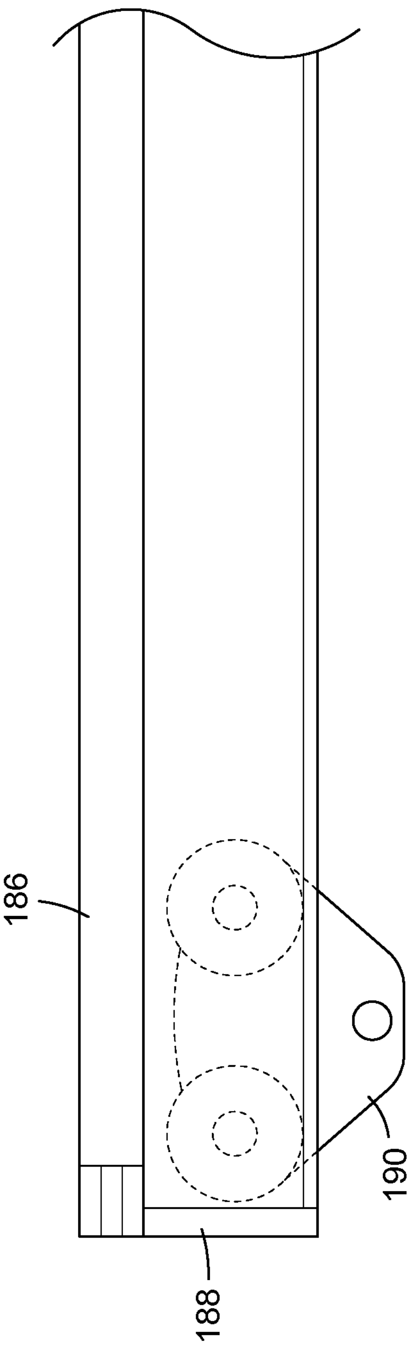
FIG. 37 is a side view of a track section and an end cap with a trolley according to another embodiment.
Figure 39:
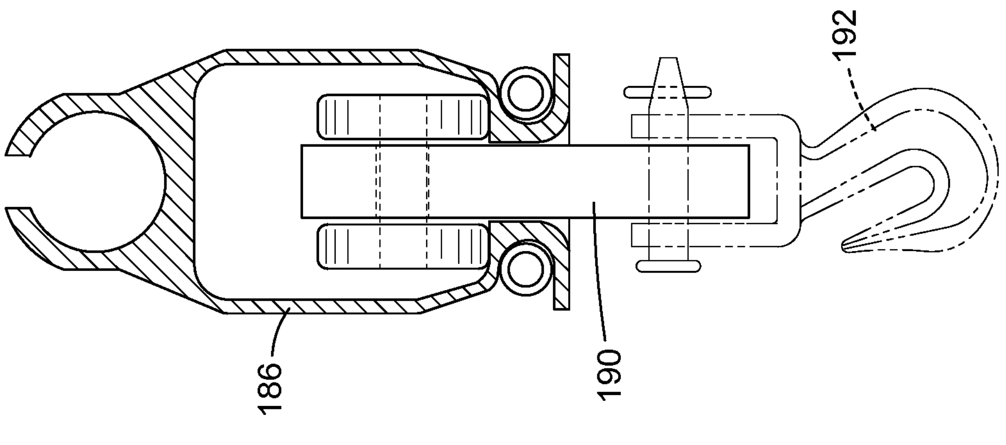
FIG. 39 is an end view of the track section and the trolley of FIG. 38 a seen along the axis 39-39 along with a hook (depicted in dashed lining)

Referring now to FIG. 37 there is depicted a track section 186 and an end cap 188. FIG. 38 depicts the end cap 188 as exploded from the track section 186. The track section 186 is similar to track section 34, and the end cap 188 is similar to the end cap 52, except for the differences shown and noted below. A trolley 190 may be utilized with the track section 186 which is similar to the trolley 30 described above. FIG. 39 there is depicted an end view of the track section 186 and the trolley 190 of FIG. 38 a seen along the axis 39-39 along with a hook 200 (depicted in dashed lining). The track section 186 is cooperatively sized and configured with an end cap 188 is a manner which is intended to allow the trolley 190 to traverse along the track section 186 as far as possible to the end of the track section 186 for a greater travel distance. The end cap 188 may be relatively narrow adjacent the lower portion of the track section 186 and substantially engaged with the track section 186 at the upper portion the track section where the end cap 188 does not interfere with movement of the trolley 190.

Figure 40:
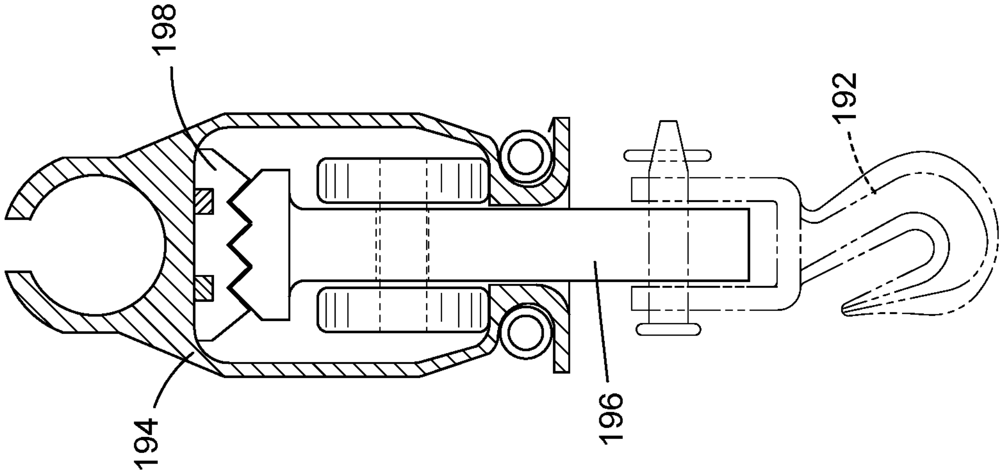
FIG. 40 is an end view similar to the view of FIG. 39 of a track section and trolley according to another embodiment.

Referring now to FIG. 40 there is depicted an end view similar to the view of FIG. 39 of a track section 194 and a trolleyl96 according to another embodiment. The track section 194 and the trolley 196 are respectively similar to the track section 186 and the trolley 190, except for the differences shown and noted below. The track section 194 may include and house an internal rail power supply 198. The trolley 190 may be readily adaptable to receive power from the from the power supply 198 through a sliding direct electrical contact between the track section 194 and the trolley 196.

Figure 41:
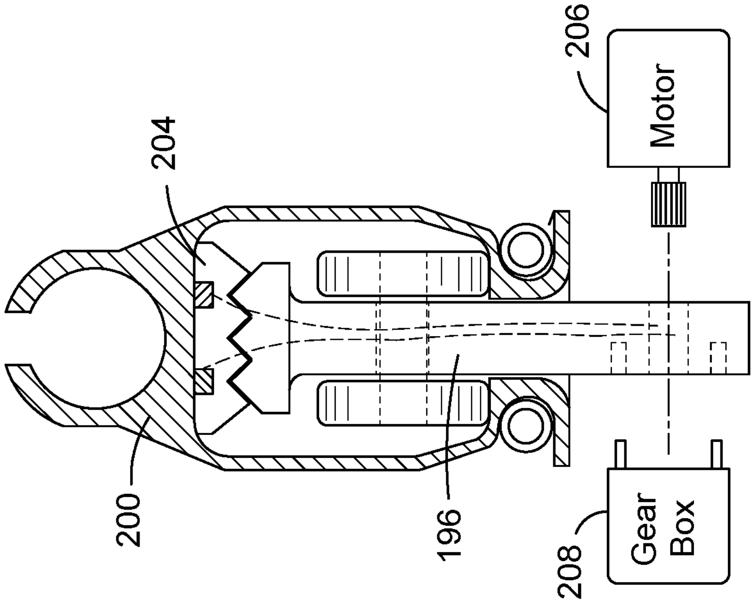
FIG. 41 is an end view similar to the view of FIG. 40 of a track section and trolley according to another embodiment.

Referring now to FIG. 41 there is depicted an end view similar to the view of FIG. 40 of a track section 200 and a trolley 202. The track section 200 and the trolley 202 are respectively similar to the track section 194 and the trolley 196, except for the differences shown and noted below. The track section 200 may include and house an internal rail power supply 204. In this embodiment the power supply 204 is used to power the trolley 202 for moving the trolley 202 along the track section 200 in addition to also powering other onboard components as may be required. In this embodiment, the trolley 202 includes an electric motor 206 that is energized by the power supply 204. The electric motor 206 may be mechanically connected to a gear box 208 for supplying mechanical motion to power the trolley 202. As such, the trolley 202 and track section 200 are modular in nature allowing for non-electric operation and also being readily transformed to be electrically powered by adding components.

Figure 42:
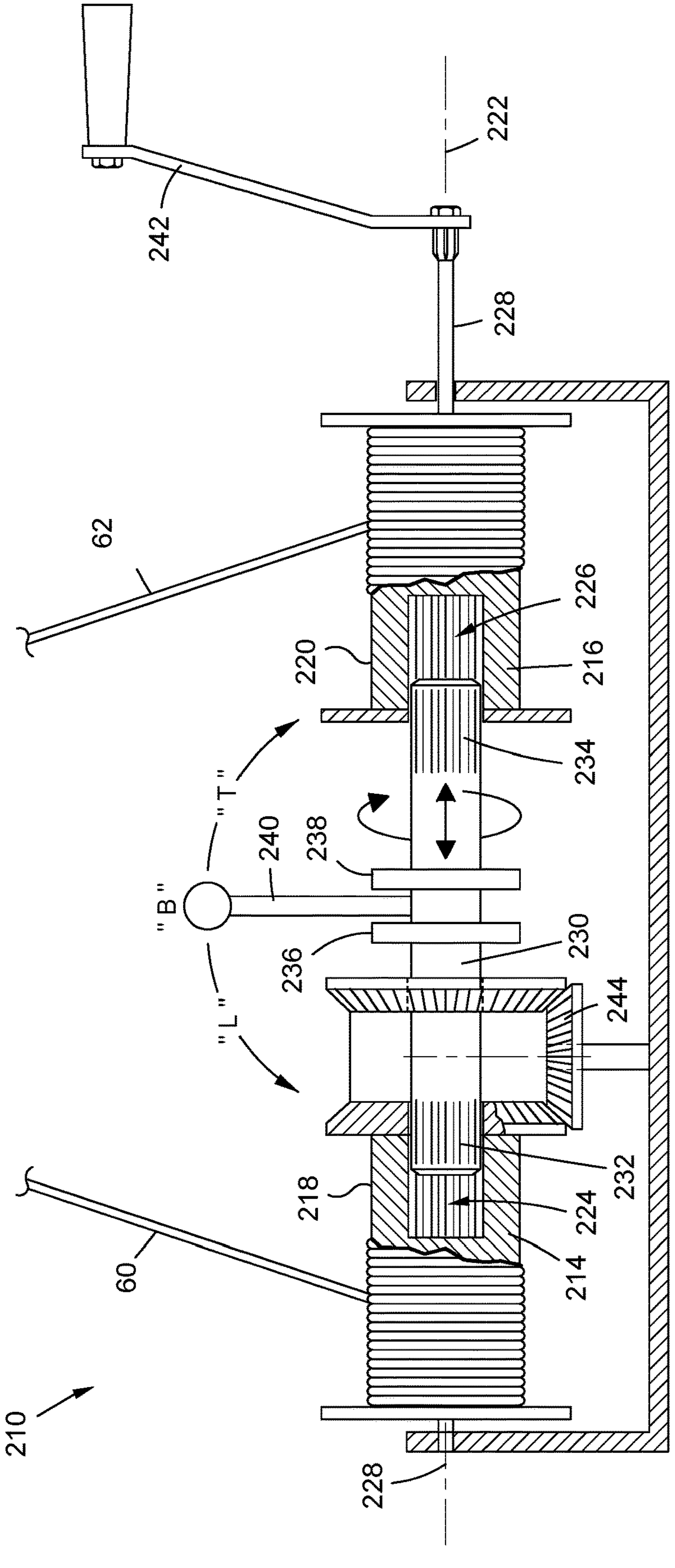
FIG. 42 is depicted a front view of a trolley winch according to an embodiment.

Davit and gantry designs utilize two independent operated wire ropes to accomplish lifting and lowering operations, as well as traversing of an associated trolley, such as the trolley 30 that interacts with the lift cable 60 and the traverse cable 62 described above. The lift cable 60 that is used to support a load as required, and the traverse cable 62 that is used to move the trolley 30 along the track 34. Referring now to FIG. 42 there is depicted trolley winch 210 that may be used alternatively to the trolley winch 54.

The trolley winch 210 may include a mountable chassis 212. In this embodiment the trolley 210 is a double-drum trolley, and the mountable chassis 212 supports a first winch drum 214 and a second winch drum 216. The first winch drum 214 has a lift cable cylindrical surface 218. The lift cable cylindrical surface 218 is configured to have the lift cable 60 wound about it. The second winch drum 216 has a traverse cable cylindrical surface 220. The traverse cable cylindrical surface 220 is configured to have the traverse cable 62 wound about it. The first and second winch drums 214 and 216 are configured to rotate about a common reel axis of rotation 222. The first winch drum 214 includes a first spline receptacle 224. The first spline receptacle 224 includes internal longitudinal threads. Similarly, the second winch drum 216 includes a second spline receptacle 226. The second spline receptacle 226 includes internal longitudinal threads. The trolley winch 210 further includes a center shaft 228. The center shaft 228 and a spline support shaft 230. The center shaft 228 extends longitudinally through the spline support shaft 230 and is support by the mountable chassis 212.

The spline support shaft 230 includes a first shaft end 232 and a second shaft end 234. The first and second shaft ends 232, 234 are externally longitudinally threaded. The first shaft end 232 is cooperatively formed with the first spline receptacle 224. The first shaft end 232 may longitudinally slide within the first spline receptacle 224 while being rotationally fixed with the first spline receptacle 224 and the first winch drum 214. The second shaft end 234 is cooperatively formed with the second spline receptacle 226. The second shaft end 234 may longitudinally slide within the second spline receptacle 226 while being rotationally fixed with the second support cavity 226 and the second winch drum 216.

The center shaft 228 is longitudinally filed relative to the mountable chassis 212. With the selection lever 240 in the center position ("B") (as depicted in FIG. 42, both the first shaft end 232 is received and engaged with the first spline receptacle 224 and the second shaft end 234 is received and engaged with the second spline receptacle 226. This engages the first and second winch drums 214, 216 for simultaneous lifting/lowering and traversing functions as the lift cable 60 and the traverse cable 62 are respectively wound and unwound upon the lift cable cylindrical surface 218 and the traverse cable cylindrical surface 220.

The spline support shaft 230 is adjustable in longitudinally position along the center shaft 228 (to the left and right in FIG. 42). The spline support shaft 230 may include first and second flanges 236, 238. A selection lever 240 extends from a collar that is disposed about the spline support shaft 230 between the first and second flanges 236, 238. The first and second flanges 236, 238 allow the spline support shaft 230 to index with respect to the first and second winch drums 214, 216.

The selection lever 240 may be manually pushed in the left direction ("L") until the first shaft end 232 of the spline support shaft 230 is received and engaged with the first spline receptacle 224 and the second shaft end 234 is cleared of the second spline receptacle 226. This engages the first winch drum 214 without engagement of the second winch drum 216 for lifting and lowering functions as the lift cable 60 is wound and unwound upon the lift cable cylindrical surface 218. The selection lever 240 may be manually pushed in the right direction ("T") until the second shaft end 234 of the spline support shaft 230 is received and engaged with the second spline receptacle 226 and the first shaft end 232 is cleared of the first spline receptacle 224. This engages the second winch drum 216 without engagement of the first winch drum 214 for traversing functions as the traverse cable 62 is wound and unwound upon the traverse cable cylindrical surface 220.

The drive source of the trolley winch 210 may be manual in nature. A hand crank 242 may be attached to the center shaft. The drive source may also be powered, such as via a pneumatic or electric motor. The direction of rotational motion for all functions is dependent upon the direction of travel provided the drive source. A gear reduction mechanism 244 may be incorporated with the spline support shaft 230 to provide braking or "lock out" ability of the lift and traverse functions when there is no input from the power source. A slip clutch or similar mechanism may be incorporated with the second winch drum 216 (the traversing side of the system) to allow the traversing function to cease while still allowing the lifting/lowering functions to continue. An example of this would be where the lever 240 is in the "B" position and a hard stop is reached by the trolley 30 but lifting or lower is still engaged.

Figure 43:
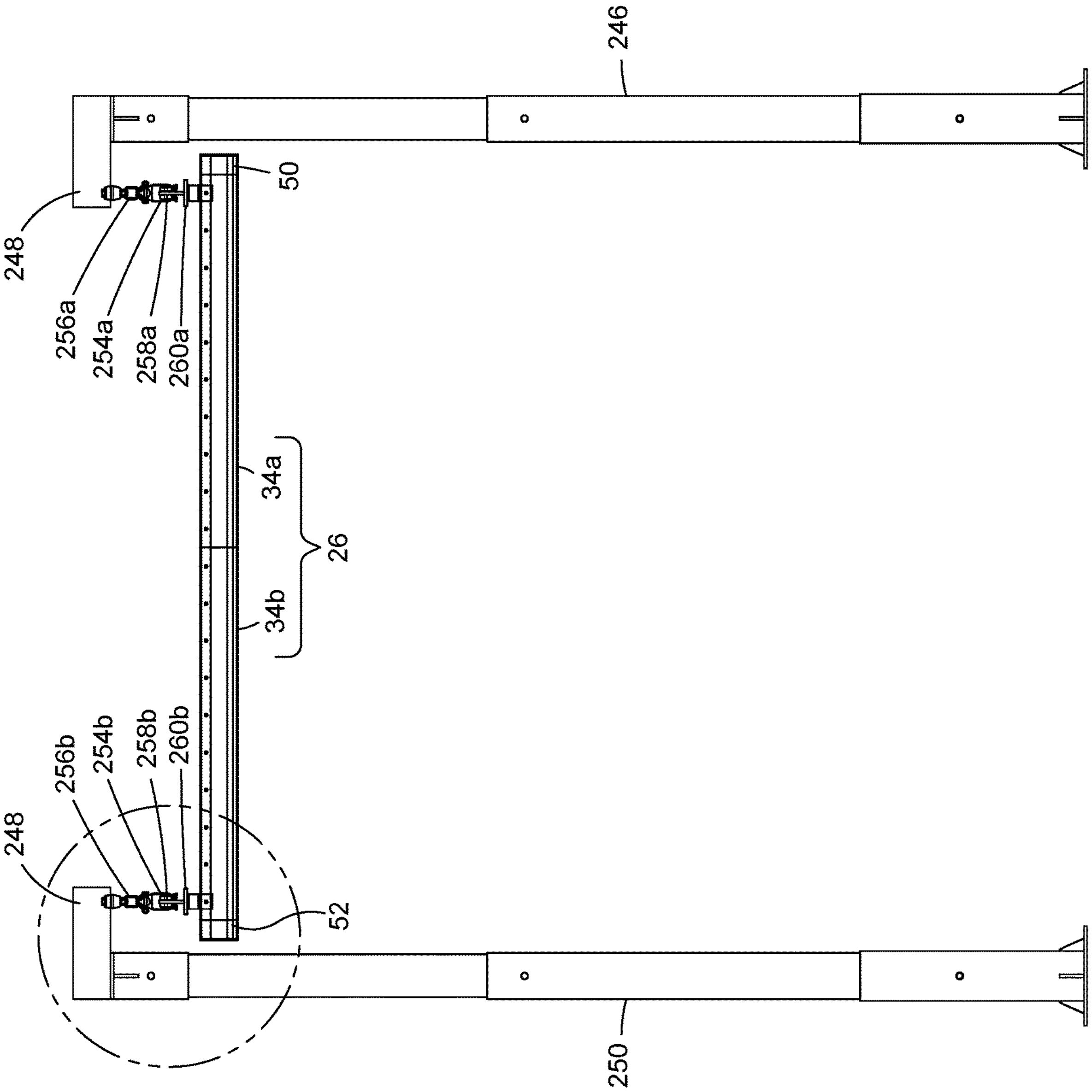
FIG. 43 is a side view of the main track as supported by additional main tracks and columns.
Figure 45:
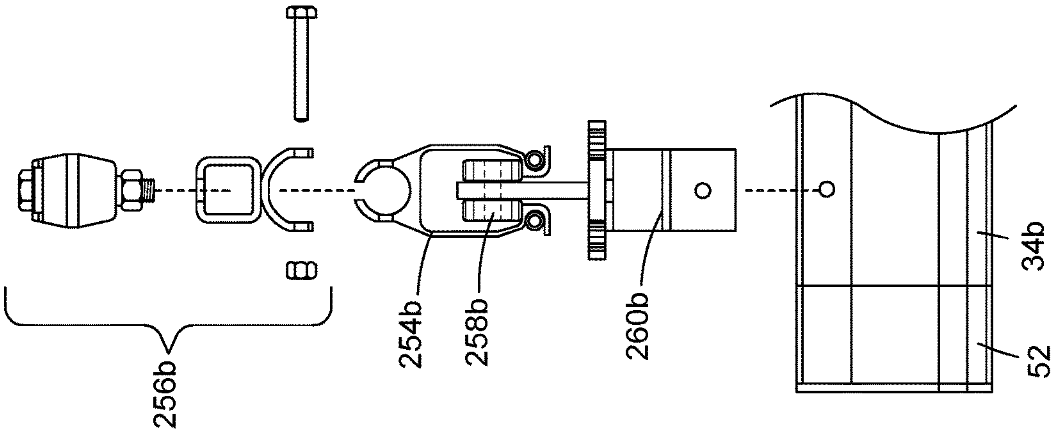
FIG. 45 is an exploded view of a portion of FIG. 44.
Figure 44:
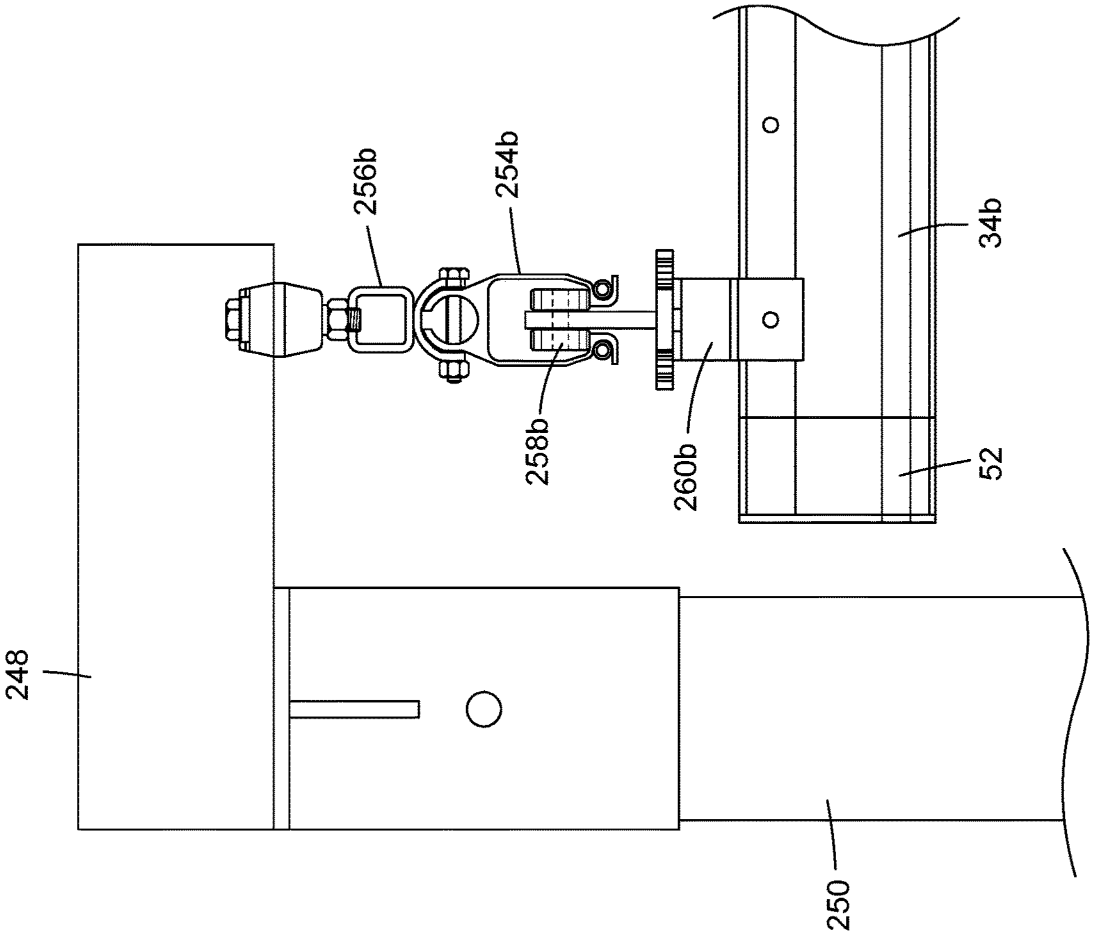
FIG. 44 is an enlarged view of a portion of FIG. 43.

Referring now to FIG. 43, there is depicted another embodiment that may include the main track 26 (including track sections 34*a,b*) and the end caps 50, 52 as described above. FIG. 44 is an enlarged of a portion of FIG. 43, and FIG. 45 is an exploded view of a portion of FIG. 44. There is provided a first column 246 with a first armature 248 and a second column 250 with a second armature 252. The first and second columns 246, 250 may be adjustable in length to as to allow for changes in the vertical height of the attached first and second armatures 248, 252. The track sections 34*a,b* are attached to and suspended from the first and second armatures 248, 252. Further, the main track 26 may be attached to main tracks 254*a,b* which in turn are respectively attached to the first and second armatures 248, 252. The main tracks 254*a,b* may be similar in construction to the main track 26. Hanger couplings 256*a,b* are respectively used to attach the main tracks 254*a,b* to the first and second armatures 248, 252. Trolleys 258*a,b* may be operated within each of the main tracks 254*a,b*. The trolleys 258*a,b* may be similar to the trolley 30. Trolley hangers 260*a,b* may extend from each of the trolleys 258*a,b*. It is understood that additional support structures would be used to support other portions of the main tracks 254*a,b* (which would be into or out of the page in this view). With this construction, it is understood that the trolleys 258*a,b* may be used in unison to move the main track 26 (into and out of the page in this view). Advantageously this configuration allows for freedom of movement in additional horizontal directions.

Figure 48:
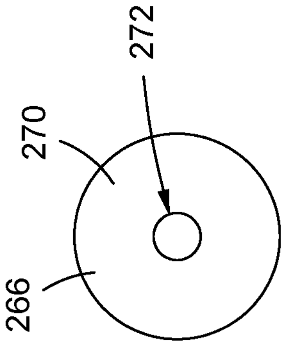
FIG. 48 is an end view of an outer tube of the rigid support hanger.
Figure 46:
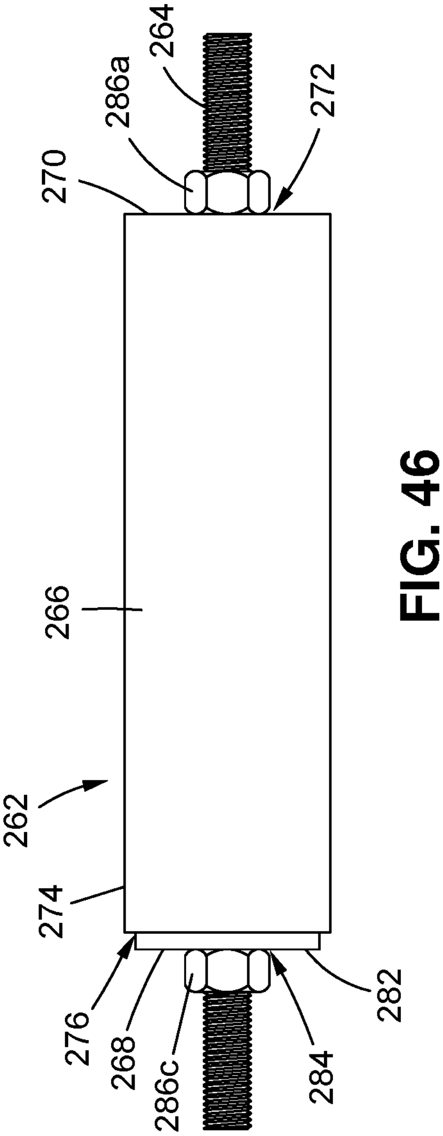
FIG. 46 is a side view of a rigid support hanger.
Figure 47:
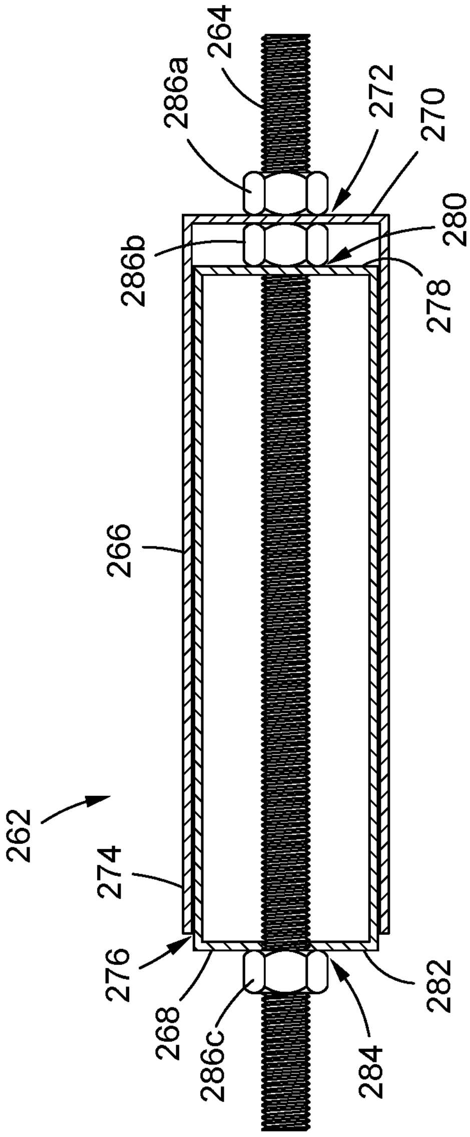
FIG. 47 is a cross-sectional side view of the rigid support hanger of FIG. 46.

Referring now to FIG. 46, there is depicted a side view of a rigid support hanger 262. FIG. 47 is a cross-sectional side view of the rigid support hanger 262 of FIG. 46. The support hanger 262 may be used to connect the main track 26 to a ceiling or a freestanding support structure. A rigid support hanger 262 includes a main rod 264, an outer tube 266 and an inner tube 268. FIG. 48 is an end view of the outer tube 266 of the rigid support hanger 262. The main rod 264 is threaded.

The outer tube 266 includes first end 270 with a first end opening 272 and a second end 274 with a second end opening 276. The first end opening 272 is configured to receive the main rod 264 therethrough. The second end opening 276 is configured to receive the inner tube 266 therethrough. The inner tube 268 includes first end 278 with a first end opening 280 and a second end 282 with a second end opening 284. The first and second end openings 280, 284 are configured to receive the main rod 264 therethrough. Retaining nuts 286*a,b,c* are provided that are sized and configured to engage the main rod 264. The retaining nut 286*a* is engaged with the first end 270 at the first end opening 272. The retainer nut 286*b* is engaged with the first end 278 at the first end opening 280. The retaining nut 286*c* is engaged with the second end 282 at the second end opening 284.

Figure 49:
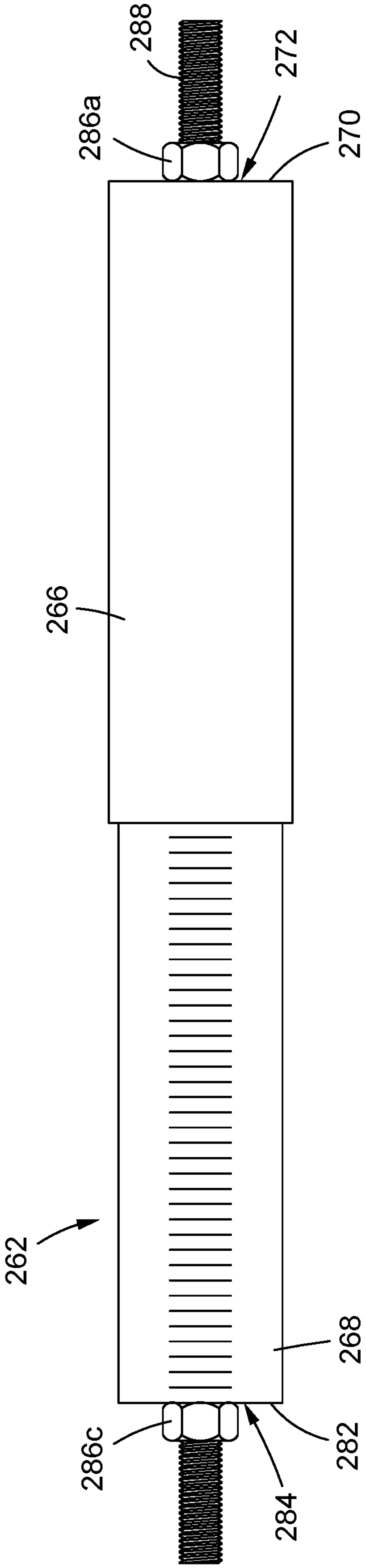
FIG. 49 is a side view of a rigid support hanger with a main rod.
Figure 50:
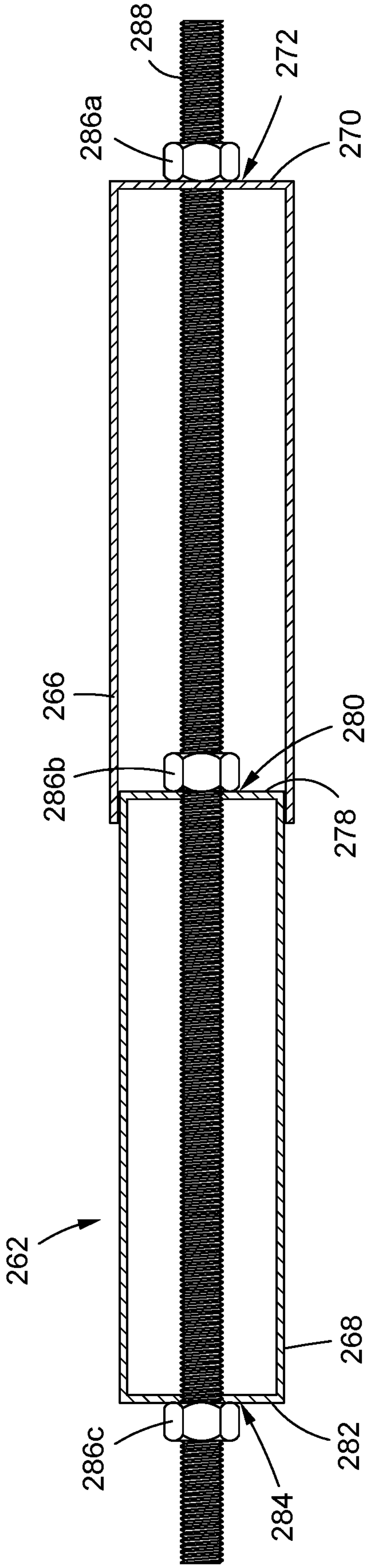
FIG. 50 is a cross-sectional side view of the rigid support hanger of FIG. 49.

The ridge support hanger 262 incorporates a-tube-within-a-tube design such that when assembled, allows the main rod 262 to shorted or lengthen while maintaining torsional rigidity and reducing flex in the connection. The design provides a desired adjustability while at the same time eliminating the need for cross brace supports that require additional time for installation and material. Referring to FIG. 49 there is provided a main rod 288 that is substantially longer in length than the main rod 264. FIG. 50 is a cross-sectional side view of the rigid support hanger 262 of FIG. 49. The main rod 288 may be used with the inner and outer tubes 266, 288 and the retaining nuts 286*a,b,c*.

Figure 51:
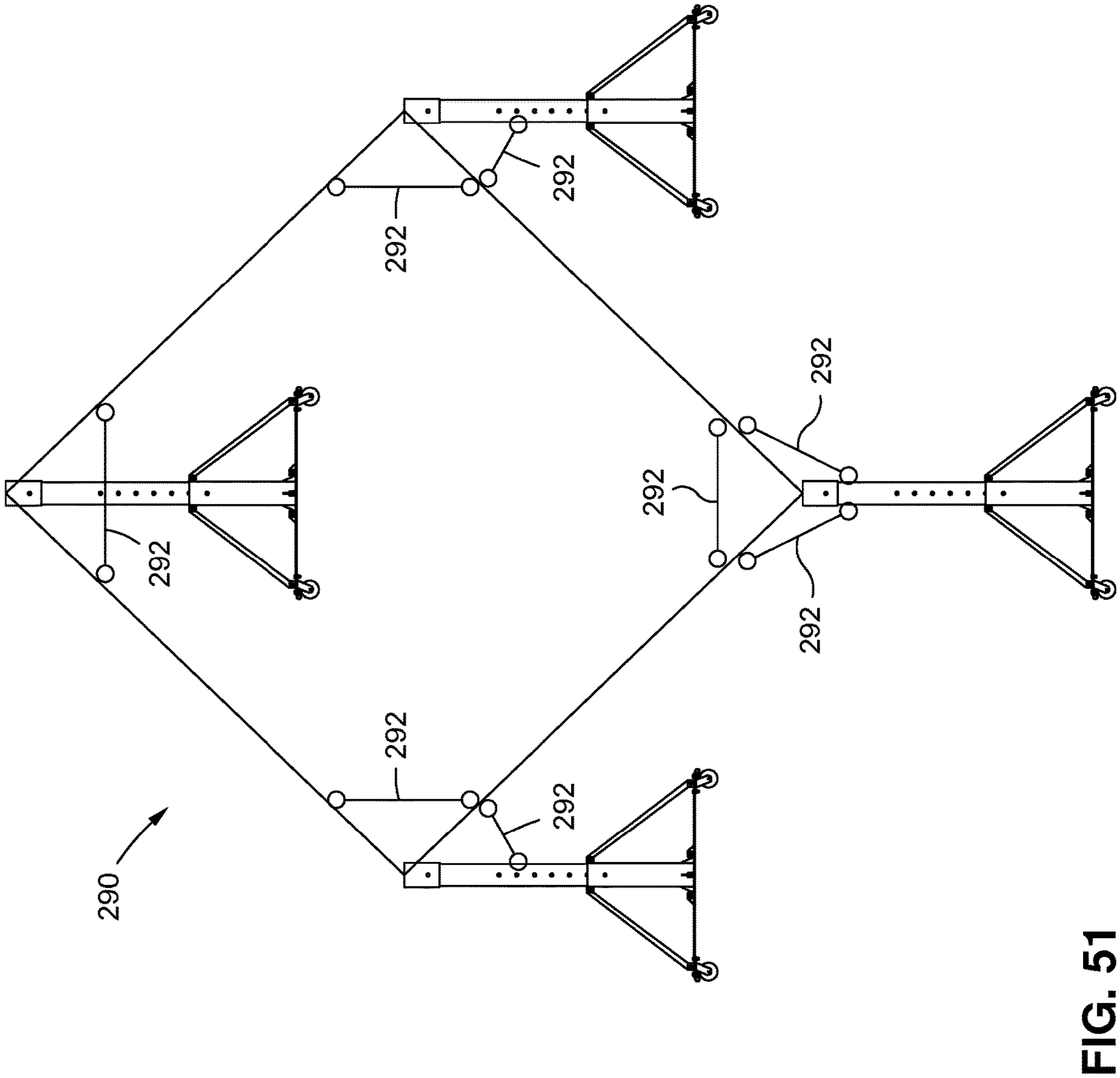
FIG. 51 is a symbolic view of an overhead modular crane system.

Referring now to FIG. 51 there is depicted a symbolic view of an overhead modular crane system 290 according to an aspect of the present invention. The crane system 290 may utilize any of those components of the crane system 10 described above in its various embodiments. It is contemplated that various supports 292 of a common size may be used to support and brace various overhead components of the crane system 290.

The particulars shown herein are by way of example only for purposes of illustrative discussion and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A crane base support system for use with a parapet wall extending vertically from a floor, the crane base support system comprising:

a base plate positionable upon the floor;

a central column extending from the base plate;

support legs each having a distal end and an attachment end, the attachment end of each of the support legs being rotatably attached to the base plate, the support legs each having an extended position with the support legs extending radially from the base plate and a folded position with support legs extending generally along the central column; and a parapet wall clamp attached to and extending laterally from the central column, the parapet wall clamp having a jaw with a jaw opening facing generally towards the base plate, the jaw opening being sized and configured to receive and engage the parapet wall.

2. The crane base support system of claim 1 wherein the parapet wall clamp includes a clamp arm attached to the central column and disposed between the central column and the jaw.

3. The crane base support system of claim 1 wherein the parapet wall clamp is selectively laterally positionable from the central column for adjusting a distance of the jaw from the central column.

4. The crane base support system of claim 1 wherein the parapet wall clamp is selectively vertically positionable along the central column for adjusting a height of the jaw from the floor.

5. The crane base support system of claim 1 wherein the base plate having clevis attachment elements generally extending from the base plate in a direction of the central column, each attachment end of the support legs is attached to the base plate via rotational engagement with a respective one of the clevis attachment elements.

6. The crane base support system of claim 1 wherein the central column includes a base end attached to the base plate and a crane end disposed away from the base plate, the system further includes an elongate crane track attached to the crane end of the central column and extending generally in a same direction of the parapet wall clamp.

7. The crane base support system of claim 6 further includes a trolley engaged with the crane track, the trolley is sized and configured to traverse along the crane track.

8. A crane base support system for use with a parapet wall extending vertically from a floor, the crane base support system comprising:

a first base plate positionable upon the floor;

a first central column extending from the first base plate, the first central column including a base end attached to the first base plate and a crane end disposed away from the first base plate;

a parapet wall clamp attached to and extending laterally from the first central column, the parapet wall clamp having a jaw with a jaw opening facing generally towards the first base plate, the jaw opening being sized and configured to receive and engage the parapet wall;

a second base plate positionable upon the floor;

a second central column extending from the second base plate, the second central column including a base end attached to the second base plate and a track end disposed away from the second base plate; and a main track disposed between the first and second central columns and attached to the crane end of the first central column and attached to the track end of the second central column.

9. The crane base support system of claim 8 further includes an elongate crane track attached to the crane end of the first central column and extending generally in a same direction of the parapet wall clamp and away from the main track.

10. The crane base support system of claim 9 further includes a trolley engaged with the crane track, the trolley is sized and configured to traverse along the elongate crane track.

11. The crane base support system of claim 8 wherein the parapet wall clamp includes a clamp arm attached to the first central column and disposed between the first central column and the jaw.

12. The crane base support system of claim 8 wherein the parapet wall clamp is selectively laterally positionable from the first central column for adjusting a distance of the jaw from the first central column.

13. The crane base support system of claim 8 wherein the parapet wall clamp is selectively vertically positionable along the first central column for adjusting a height of the jaw from the floor.

14. The crane base support system of claim 8 further includes a counter-weight support and a counter-weight, the counter-weight support is removeably attached to the second base plate, the counter-weight is disposed upon the counter-weight support.

15. The crane base support system of claim 8 further includes first support legs each having a distal end and an attachment end, the attachment end of each of the first support legs is attached to the first base plate and with the distal ends extendable along the floor and away from the first base plate, the crane base support system further includes second support legs each having a distal end and an attachment end, the attachment end of each of the second support legs is attached to the second base plate and with the distal ends extendable along the floor and away from the second base plate.

16. The crane base support system of claim 15 further includes casters attached to the distal ends of the first and second support legs.

17. A combined trolley winch system with lift and traverse selection, the trolley winch system comprising:

an overhead track;

a trolley engaged with the overhead track, the trolley and the track being cooperatively sized and configured to traverse the trolley along the track;

a first winch drum having a lift cable cylindrical surface disposed about a reel axis of rotation;

a lift cable engaged with the winch drum about the lift cable cylindrical surface and engaged with the trolley;

a second winch drum having a traverse cable cylindrical surface disposed about the reel axis of rotation;

a traverse cable engaged with the winch drum about the traverse cable cylindrical surface and engaged with the trolley; and a winding mechanism connected to the first and second drums, the winding mechanism sized and configured to rotate the first drum about the reel axis of rotation for winding the lift cable about the lift cable cylindrical surface independently from rotating the traverse cable cylindrical surface, the winding mechanism sized and configured to rotate the second drum about the reel axis of rotation for winding the traverse cable about the traverse cable cylindrical surface independently from rotating the lift cable cylindrical surface.

18. The combined trolley winch system of claim 17 wherein the winding mechanism includes a spline support shaft disposed about the reel axis of rotation between the first and second drums, the first drum has a first spline receptacle longitudinally extending into the first drum, the second drum has a second spline receptacle longitudinally extending into the second drum, the spline support shaft is longitudinally movable along the reel axis of rotation.

19. The combined trolley winch system of claim 18 wherein the first splines receptacle is sized and configured to receive and engage the spline support shaft therein, and the second splines receptacle is sized and configured to receive and engage the spline support shaft therein.

20. The combined trolley winch system of claim 18 wherein the spline support shaft is positionable within the first spline receptacle without being within the second spline receptacle, the spine support shaft is positionable within the second spine receptacle without being within the first spline receptacle.

* * * * *